US010735499B2

(12) United States Patent
Holgers et al.

(10) Patent No.: US 10,735,499 B2
(45) Date of Patent: Aug. 4, 2020

(54) VIRTUAL NETWORK INTERFACE MULTIPLEXING

(71) Applicant: Amazon Technologies, Inc., Seattle, WA (US)

(72) Inventors: Tobias Lars-Olov Holgers, Seattle, WA (US); Kevin Christopher Miller, Herndon, VA (US); Andrew Bruce Dickinson, Seattle, WA (US); David Carl Salyers, Seattle, WA (US); Xiao Zhang, Vienna, VA (US); Shane Ashley Hall, Kirkland, WA (US); Christopher Ian Hendrie, Centreville, VA (US); Aniket Deepak Divecha, Seattle, WA (US); Ralph William Flora, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/362,192

(22) Filed: Mar. 22, 2019

(65) Prior Publication Data
US 2019/0222636 A1 Jul. 18, 2019

Related U.S. Application Data

(63) Continuation of application No. 15/881,545, filed on Jan. 26, 2018, now Pat. No. 10,244,044, which is a (Continued)

(51) Int. Cl.
H04L 29/08 (2006.01)
H04L 29/06 (2006.01)
G06F 9/455 (2018.01)

(52) U.S. Cl.
CPC .......... H04L 67/10 (2013.01); G06F 9/45533 (2013.01); H04L 67/42 (2013.01)

(58) Field of Classification Search
CPC ...... H04L 67/10; H04L 67/42; G06F 9/45533
(Continued)

(56) References Cited

U.S. PATENT DOCUMENTS 6,330,599 B1 * 12/2001 Harvey ................... H04L 29/06
709/217
7,782,869 B1 8/2010 Chitlur Srinivasa
(Continued)

OTHER PUBLICATIONS

U.S. Appl. No. 14/736,163, filed Jun. 10, 2015, Colm Maccarthaigh.
(Continued)

Primary Examiner — Michael Won
(74) Attorney, Agent, or Firm — Robert C. Kowert; Kowert, Hood, Munyon, Rankin & Goetzel, P.C.

(57) ABSTRACT

A control-plane component of a virtual network interface (VNI) multiplexing service assigns one or more VNIs as members of a first interface group. A first VNI of the interface group is attached to a first compute instance. Network traffic directed to a particular endpoint address associated with the first interface group is to be distributed among members of the first interface group by client-side components of the service. The control-plane component propagates membership metadata of the first interface group to the client-side components. In response to a detection of an unhealthy state of the first compute instance, the first VNI is attached to a different compute instance by the control-plane component.

20 Claims, 11 Drawing Sheets

Related U.S. Application Data continuation of application No. 14/565,164, filed on Dec. 9, 2014, now Pat. No. 9,882,968.

(58) Field of Classification Search
USPC .......................................... 709/203, 230, 245
See application file for complete search history.

(56) References Cited

U.S. PATENT DOCUMENTS

| | | | |
|---|---|---|---|
| 7,783,788 B1 | 8/2010 | Quinn et al. | |
| 8,549,518 B1* | 10/2013 | Aron | G06F 9/45558 |
| | | | 718/1 |
| 9,172,621 B1 | 10/2015 | Dippenaar | |
| 9,323,577 B2 | 4/2016 | Marr et al. | |
| 9,407,545 B1 | 8/2016 | Ghosh | |
| 9,652,265 B1* | 5/2017 | Narayanasamy | G06F 16/1748 |
| 9,882,968 B1* | 1/2018 | Holgers | H04L 67/10 |
| 9,998,955 B1* | 6/2018 | MacCarthaigh | H04L 69/22 |
| 10,244,044 B2* | 3/2019 | Holgers | H04L 67/10 |
| 10,326,710 B1* | 6/2019 | Hashmi | H04L 47/783 |
| 2003/0182322 A1* | 9/2003 | Manley | G06F 16/184 |
| 2005/0015436 A1 | 1/2005 | Singh et al. | |
| 2011/0142053 A1* | 6/2011 | Van Der Merwe | H04L 47/72 |
| | | | 370/395.1 |
| 2011/0283017 A1 | 11/2011 | Alkhatib et al. | |
| 2012/0198064 A1 | 8/2012 | Boutros et al. | |
| 2012/0331142 A1 | 12/2012 | Mittal et al. | |
| 2013/0108259 A1 | 5/2013 | Srinivas et al. | |
| 2014/0082614 A1 | 3/2014 | Klein et al. | |
| 2014/0092828 A1 | 4/2014 | Sirotkin | |
| 2014/0108775 A1 | 4/2014 | Kludy et al. | |
| 2014/0196038 A1 | 7/2014 | Kottomtharayil et al. | |
| 2014/0226523 A1 | 8/2014 | Deshpande | |
| 2014/0301192 A1 | 10/2014 | Lee et al. | |
| 2015/0100704 A1 | 4/2015 | Davie et al. | |
| 2015/0143374 A1 | 5/2015 | Banga et al. | |
| 2015/0244775 A1 | 8/2015 | Vibhor et al. | |
| 2015/0261558 A1* | 9/2015 | Robinson | G06F 9/45558 |
| | | | 718/1 |
| 2015/0269383 A1 | 9/2015 | Lang et al. | |
| 2015/0378769 A1 | 12/2015 | Buck et al. | |
| 2016/0028557 A1 | 1/2016 | Dong et al. | |
| 2016/0105350 A1 | 4/2016 | Greifeneder et al. | |
| 2016/0162317 A1 | 6/2016 | Doherty et al. | |
| 2016/0162320 A1 | 6/2016 | Singh et al. | |
| 2016/0164738 A1 | 6/2016 | Pinski et al. | |
| 2016/0344798 A1 | 11/2016 | Kapila | |
| 2016/0373405 A1 | 12/2016 | Miller et al. | |
| 2017/0180211 A1 | 6/2017 | Johnson | |
| 2017/0220370 A1 | 8/2017 | Klompje et al. | |
| 2018/0278578 A1 | 9/2018 | Johnsen et al. | |
| 2018/0316769 A1* | 11/2018 | Akers | H04L 67/10 |
| 2019/0068689 A1* | 2/2019 | Ram | H04L 49/70 |
| 2020/0073692 A1* | 3/2020 | Rao | G06F 9/5077 |
| 2020/0076685 A1* | 3/2020 | Vaidya | G06F 9/45558 |

OTHER PUBLICATIONS

U.S. Appl. No. 14/736,165, filed Jun. 10, 2015, Colm Maccarthaigh.
U.S. Appl. No. 14/736,167, filed Jun. 10, 2015, Colm Maccarthaigh.
U.S. Appl. No. 14/736,172, filed Jun. 10, 2015, Colm Maccarthaigh.
"A Brief Primer on Anycast", Matthew Prince, Oct. 21, 2011, pp. 1-4.
"Amazon Elastic Compute Cloud", User Guide for Linux, API Version, Jun. 15, 2014, pp. 1-684.

* cited by examiner

1:1:1 VNI:NIC:Host mapping

N:N:1 VNI:NIC:Host mapping

N:1:1 VNI:NIC:Host mapping

Instantiate a group of service compute instances (SCIs) to handle incoming requests for service Svc1 from some set of clients, e.g., either as request distributors to a back-end layer of Svc1, or to perform the requested work  801

Assign virtual network interfaces (some or all of which may be trunked or configurable with multiple network addresses) attached to the service compute instances as members of an interface group (IG) with which at least one client-accessible service endpoint address (CSEA) is to be associated  804

Identify set of client-side components (e.g., virtualization management components (VMCs) at instance hosts where client compute instances run, and/or edge network devices) that are to distribute request traffic among the IG members, e.g., without using an intermediary load balancer  807

Propagate initial IG membership metadata (e.g., including an initial target selection policy which may utilize weights assigned to each member) to client-side components  810

Collect performance data and/or health state information pertaining to IG members, propagate to client-side components  813

In the event of failures of one or more of the SCIs, transfer (e.g., using detach/attach sequence) or replace affected VNIs as needed, propagate updated membership information to client-side components  816

*FIG. 8*

VIRTUAL NETWORK INTERFACE MULTIPLEXING

This application is a continuation of U.S. patent application Ser. No. 15/881,545, filed Jan. 26, 2018, which is a continuation of U.S. patent application Ser. No. 14/565,164, filed Dec. 9, 2014, now U.S. Pat. No. 9,882,968, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine may be regarded as a software simulation acting as a distinct logical computing system that provides users with the illusion that they are the sole operators and administrators of a given hardware computing resource, while also providing application isolation and security among the various virtual machines.

Operators of data centers that provide different types of virtualized computing, storage, and/or other services usually rely on standard networking protocols to receive customer requests and transmit responses to such requests using commodity network hardware such as various types of network interface cards (NICs). Until a few years ago, networking configuration for virtualized computing environments was still being managed at the physical NIC level. Some network operators have recently incorporated virtual network interfaces (which may also be referred to as "elastic network interfaces") into their infrastructure, enabling some networking-related attributes such as IP (Internet Protocol) addresses to be transferred relatively easily between virtual machines without necessarily reconfiguring physical NICs. Such attribute transfers may be accomplished, for example, by detaching a virtual network interface programmatically from one virtual machine and attaching it programmatically to another virtual machine. While easing the complexity of network configuration somewhat, however, at least some virtual network interface implementations may still not support the kinds of flexibility (e.g., in terms of the way network addresses can be dynamically re-mapped to underlying physical resources) demanded by some applications and services that are being targeted for virtual computing environments.

BRIEF DESCRIPTION OF DRAWINGS

FIG. 8 is a flow diagram illustrating aspects of operations that may be performed by control-plane components of a VNI multiplexing service, according to at least some embodiments.

Figure 1:
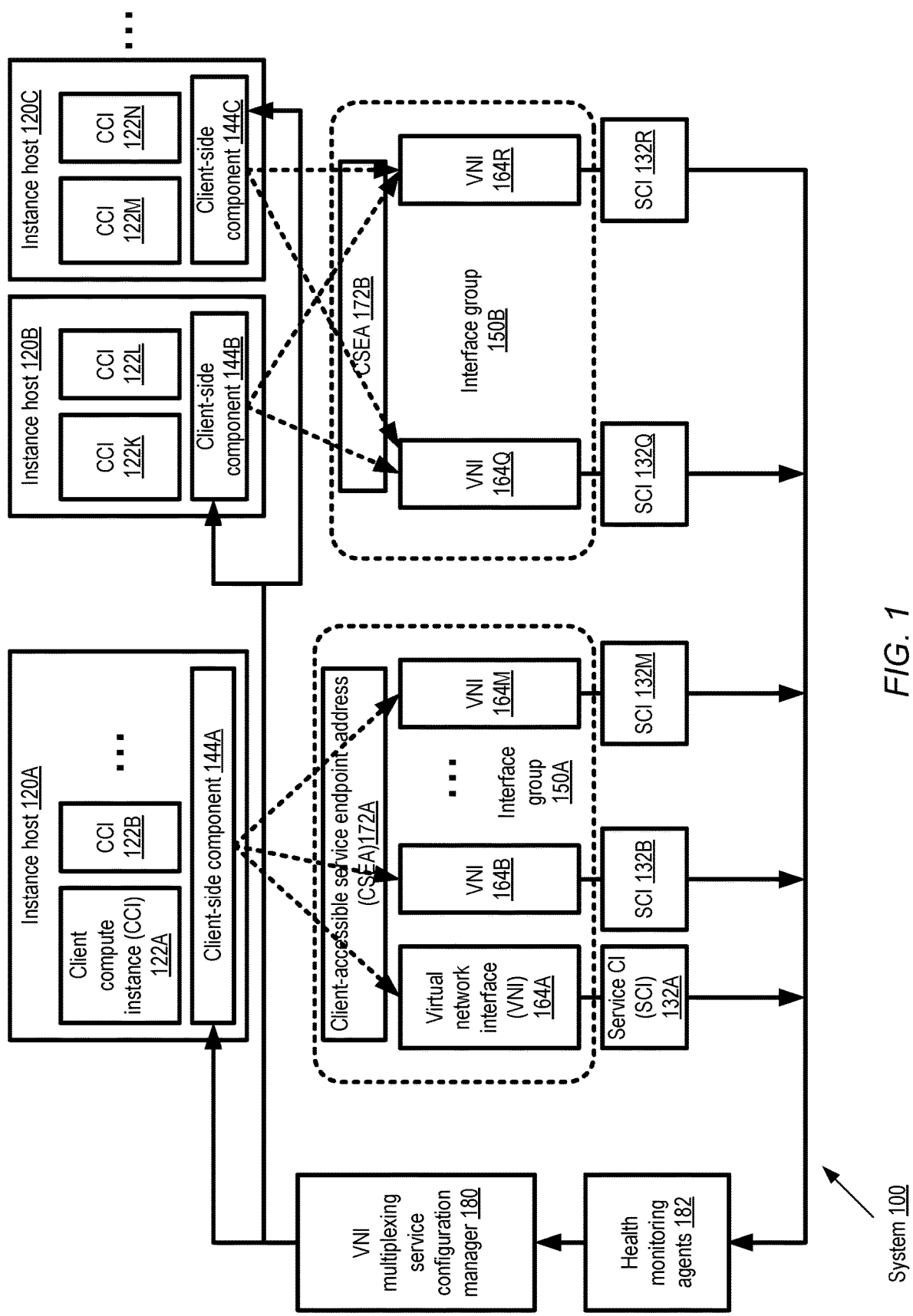
FIG. 1 illustrates an example system environment in which interface groups comprising a plurality of virtual network interfaces (VNIs) associated with a single client-accessible service endpoint address (CSEA) may be established using a VNI multiplexing service of a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for multiplexing virtual network interfaces at a provider network are described. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. At least some provider networks may also be referred to as "public cloud" environments. A given provider network may include numerous data centers hosting various resource pools, such as collections of physical and/or virtualized compute servers, storage devices, networking equipment and the like, needed to implement, configure and distribute the infrastructure and services offered by the provider. In at least some embodiments, a virtual computing service implemented at a provider network may enable clients to utilize one or more guest virtual machines (which may be referred to herein as "virtualized compute servers", "compute instances" or simply as "instances") for their applications, with one or more compute instances being executed on any given instance host of a large fleet of instance hosts. Several different kinds of instances may be supported in some implementations, e.g., "large", "medium" or "small" instances that have different compute performance capabilities, different memory sizes and different amounts of persistent storage space. Within large provider networks, some data centers may be located in different cities, states or countries than others, and in some embodiments the resources allocated to a given application may be distributed among several such locations to achieve desired levels of availability, fault-resilience and performance. Generally speaking, any of a variety of networking protocols, including Transmission Control Protocol/Internet Protocol (TCP/IP) or User Datagram Protocol (UDP), may be used to access the resources of a provider network, and for communications between different resources of the provider network.

In some embodiments, the virtual computing service may enable users to associate virtual network interfaces (VNIs) with their compute instances. A VNI may comprise a logical entity with a set of networking and security-related attributes that can be attached to (or detached from) a compute instance programmatically. For example, at least one IP (Internet Protocol) address "IPaddr1" may be assigned to a given virtual network interface VNI1, and security rules restricting inbound and outbound traffic may be set for VNI1. When that VNI is programmatically attached to a given compute instance CI1 launched at an instance host with a physical network interface card NIC1, network packets indicating IPaddr1 as their destination address (and complying with the security rules) may be received at CI1 via NIC1. In addition, outbound packets generated at CI1 may indicate IPaddr1 as their source address and may be physically transmitted towards their destinations via NIC1. If VNI1 is then programmatically detached from CI1 and attached to CI2 (which is executing at a different instance host with a different physical network interface card NIC2), the IPaddr1 traffic that was previously being received at CI1 may now be received at CI2, with the same security rules in place. Support for virtual network interfaces may considerably simplify network configuration tasks for customers using the virtual computing service.

In at least some provider networks, a variety of higher-level services may be implemented by the provider network operator using resources of other services. For example, a distributed database service may utilize a storage service and the virtual computing service, or a scalable distributed file storage service implementing NFS (Network File System)-like interfaces may utilize the virtual computing service and/or a storage service. Compute instances configured to perform such a service's operations may be termed "nodes" of the service, and may be accessed in some embodiments using groups of VNIs to which network addresses associated with the service have been assigned. Such addresses may also be referred to herein as client-accessible service endpoint addresses (CSEAs). Client applications that use these higher-level services may in some cases also run on compute instances of the virtual computing service, e.g., within isolated virtual networks (sometimes referred to as virtual private clouds) set up on behalf of customers as described below in further detail. In some scenarios, end-user customers may access some services from devices located within external networks, such as customer networks in data centers outside the provider network, or from various Internet-connected computing devices (such as laptops, desktops, tablets, smart phones and the like). Service traffic from external clients may enter the provider network via various edge networking devices, such as gateways, edge routers and the like, and may be routed to the compute instances being used by the service.

For at least some services that are implemented in a distributed manner within the provider network, service requests may thus be generated at a wide variety of sources. Such requests may have to be distributed or load-balanced among a number of different compute instances deployed as nodes of the service at which the requested operations can be performed, and results of the operations may then have to be provided to the request sources. For some types of services, session state information may have to be maintained across sequences of requests. Generally speaking, the connectivity and load balancing needs of service clients may vary considerably, e.g., between different clients and over time. Service configurations in which a single VNI, or a single node of the service to which one particular VNI is attached, is used to handle request traffic directed to a given CSEA of a service may not be sufficient to deal with the variations in service connectivity requirements. In addition, associating just one CSEA with a given node of the service may sometimes result in underutilization of the node's computing capabilities.

Accordingly, in at least some embodiments, a VNI multiplexing (VNIM) service may be implemented at the provider network, enabling VNIs to be logically aggregated and mapped to CSEAs in various ways depending on the particular needs of a given service or a given set of clients of a service. Administrative or control-plane components of the VNIM service may implement programmatic interfaces that can be used, for example, to create and delete interface groups comprising some number of logically aggregated VNIs, with each such interface group being associated with a given CSEA. In at least some embodiments, data-plane components of the VNIM service may include client-side components (e.g., at instance hosts at which client applications whose requests are to be fulfilled using the interface groups, or at edge nodes of the provider network at which service requests from external networks are received) as well as service-side components at the compute instances to which the multiplexed VNIs are attached. In one embodiment, both the control-plane and the data-plane of the VNIM service may be distributed, e.g., implemented using numerous software and/or hardware components of the provider network. In some embodiments, configuration information regarding the collection of VNIs that are designated as members of an interface group may be propagated to the client-side components by control-plane components of the VNIM, enabling intelligent and stateful load balancing to be performed at the client-side component without the need of dedicated load balancers as intermediaries.

According to one embodiment, one or more control-plane components such as a configuration manager of the VNIM service may receive a request to create an interface group (IG), e.g., on behalf of another service Svc1 implemented in the provider network, or on behalf of a customer of such a service. In response, the control-plane components may generate an IG (e.g., "IG1") comprising a plurality of VNIs as members, such that each VNI of IG1 is attached to a respective compute instance and has a respective non-public IP address (e.g., an address that is not propagated via DNS or other similar mechanisms to applications utilizing Svc1). The format of such non-public network addresses may differ in various embodiments: e.g., in some embodiments, a standard IPv4 (IP version 4) or IPv6 (IP version 6) address may be used, while in other embodiments an internal address format (based on an encapsulation protocol used for internal communications within the provider network) may be used. The compute instances associated with an IG may be referred to as "service" or "service-side" compute instances, e.g., in contrast to the "client" or "client-side" compute instances at which service requests may originate for some types of services. In some scenarios, the compute instances to which the VNIs are attached may themselves perform Svc1 operations, while in other scenarios Svc1 operations may be performed at other back-end Svc1 nodes, with IG1's compute instances acting as intermediaries. In some implementations, IG1 may be created empty (with no VNIs included initially), or with some small initial number of VNIs, and more VNIs may be added programmatically after the group is created. VNIs may also be removed from IG1, for example in response to detecting that the instance to which a given VNI is attached is not responsive or has reached an unhealthy state. It is noted that the phrase "compute instances of an interface group" may be used herein as the equivalent of the phrase "compute instances attached to virtual network interfaces of an interface group"; that is, the compute instances to which the VNIs of an IG are attached may be referred to simply as the IG's compute instances. At least one client-accessible service endpoint address (CSEA) of Svc1 (which differs from the non-public IP addresses of the member VNIs) may be associated with IG1 in some embodiments. Membership metadata of IG1 may be distributed among a set of client-side components of the VNIM service to allow the client-side components to distribute service requests among the member VNIs. In at least some implementations, the different member VNIs of an given instance group may generally be considered interchangeable or functionally equivalent from the perspective of the client-side components, at least for the initial packet of any given logical flow. As described below, however, in some cases the same destination VNI may be selected for successive packets belonging to a particular logical flow. In different embodiments, the CSEA may either be assigned at the time that IG1 is set up, or it may be assigned later in a separate step. In at least some embodiments, an indication of a target selection policy to be used to distribute client requests among the member VNIs of IG1 may also be propagated to client-side components by the VNIM control plane.

A client application that is to use Svc1, e.g., an application running on a client's compute instance CCI1 at a particular instance host IH1 of the virtual computing service, may generate a service request directed to Svc1. In some embodiments, the client application may, for example, determine a network address of Svc1 using a request directed to Svc1's control-plane, or using a DNS (Domain Name Service) query. A client-accessible service endpoint address (CSEA) "Svc1-addr1" associated with IG1 may be provided to the client application in some such embodiments. The service request may be included within a baseline network packet generated at the networking software stack of CCI1, with Svc1-addr1 indicated as the destination address of the baseline packet. The virtualization management stack of the instance host IH1 (e.g., comprising a hypervisor and one or more privileged domain operating system instances) may include a client-side component of the VNI multiplexing service in such embodiments. Membership metadata for IG1 may have been propagated earlier to the client-side component. The client-side component may detect and intercept the baseline packet, and use the membership metadata (and/or an associated target selection policy) to select a particular one of the member VNIs of IG1 as a destination for the baseline packet. In one implementation, for example, the contents of the baseline packet may be incorporated within the body of an encapsulation packet by the client-side component, with the particular non-public IP address of the target VNI indicated as the target address for the encapsulation packet. Any of a number of different encapsulation protocols (such as Generic Routing Encapsulation or GRE, or a custom encapsulation protocol of the provider network) may be used in various embodiments. In at least some embodiments, the client-side component may store a connection tracking record indicating that the target VNI was selected for the particular baseline packet, and the connection tracking record may be used to again select that same target VNI for subsequent baseline packets containing Svc1 requests received from the same client application or the same client application session.

The encapsulation packet may then be transmitted to the selected VNI's non-public IP address. The compute instance to which the selected VNI is attached may receive the encapsulation packet. If the compute instance is itself configured to perform the requested service operations that were indicated in the baseline packet, the service request may be extracted from the encapsulation packet and the appropriate operations may be performed; otherwise, the encapsulation packet or the extracted baseline packet may be transmitted to back-end nodes of Svc1.

In some embodiments, one or more VNIs of an IG such as IG1 may be configured in "trunked" mode, e.g., with several different CSEAs assigned to an individual VNI. In this way, traffic directed at potentially large numbers (e.g., tens or hundreds) of CSEAs of a service such as Svc1 from respective client applications may be handled at a given compute instance in a multi-tenant fashion. In some embodiments, a given trunked-mode VNI assigned with N different CSEAs may be designated as a member of N distinct IGs, with each of the N CSEAs assigned to a respective IG. Each of the N IGs in such a scenario may have been set up, for example, to receive traffic from a respective set of client-side components of the multiplexing service (although in at least some embodiments, any given client-side component may belong to several of the sets, and may therefore direct encapsulation packets to several IGs as needed).

The control-plane components of the VNI multiplexing service may be responsible for monitoring the health state of the instances to which the member VNIs of various IGS are assigned, and for providing updates of the health state to the client-side components. In accordance with one aspect of a target selection policy associated with an interface group, the client-side components may use the provided health state updates to avoid selecting unhealthy service compute instances as the destinations for outgoing packets in some embodiments. For the purposes of health monitoring, the term "health state of a VNI" may be considered synonymous herein with the term "health state of a service compute instance to which the VNI is attached". In one embodiment, respective health state entries may be maintained (e.g., as respective bits of a bit map) for the VNIs/instances of one or more IGs at a given client-side component. When selecting a target VNI for a particular packet, the client-side component may avoid those VNIs whose health state entries indicate unhealthy states. In some embodiments, health monitoring agents and/or services may have been set up for other purposes in the provider network, and such agents and services may be used for the VNI multiplexing service as well, thus eliminating the need for health monitoring resources that are dedicated to the multiplexing service alone.

In one embodiment, a "fail-up" approach may be used for target selection by the client-side components under certain conditions. According to this approach, if a client-side component receives health status updates during a given time period indicating that more than a threshold number of VNIs of a given IG are apparently in an unhealthy state (e.g., because the service compute instances to which those VNIs are attached appear to be unresponsive), a client-side component may decide to ignore the reports of unhealthy state. Instead, for example, all the VNIs of the IG may be marked as being healthy in the health state entries maintained by the client-side component, and packet targets may be selected accordingly. The fail-up approach may be used in some embodiments based on the assumption that the reporting of large numbers of failures may often result from problems in the health monitoring infrastructure itself, rather than from actual failures at the entities being monitored. By the time that all N VNIs (or some large subset of (N-m) VNIs) of a given IG are reported as unhealthy, under such an assumption, the service may already be operating in such a degraded mode that relatively few negative consequences may result from disregarding the reports of the failures. Of course, if the failure reports are eventually determined to be accurate, some packets may have been lost, but similar packet losses may have occurred even if the "fail-up" approach had not been used.

According to one embodiment in which connection-oriented protocols such as TCP are used, the responsibility for an in-progress connection may be transferred from one service compute instance (attached to a particular VNI of an IG) to a different service compute instance (attached to a different VNI of the IG) as and when necessary. For example, upon detecting a failure associated with one service compute instance that had been receiving packets belonging to a particular TCP connection, a control-plane component of the multiplexing service may select a substitute or replacement service compute instance to receive subsequent packets belonging to that same TCP connection, without terminating or dropping the connection. Metadata indicating the replacement may be transmitted to the client-side component from which the packets of the TCP connection have been received thus far. Such a transfer of a persistent or long-lasting connection, without terminating the connection, may also be referred to as "connection pickup" herein. The client application involved may not even be aware that anything has changed in at least some embodiments in which connection pickup is implemented in response to a failure.

In some embodiments, a VNI multiplexing service may implement one or more sets of programmatic interfaces (e.g., web-based consoles, application programming interfaces, command-line tools or standalone GUIs) that can be used to set or obtain various types of interface group attributes. Using such an interface, a client of the VNI multiplexing service may set up and tear down IGs, add new VNIs to IGs, remove VNIs from IGs, modify the target selection settings associated with IGs, assign addresses to IGs and so on. It is noted that in various embodiments, a variety of internal and external customers may utilize the VNI multiplexing service—e.g., IGs may be set up for other services of the provider network, or for entities (such as individual or organizations) outside the provider network including users of other services implemented at the provider network. Thus, in some cases, the programmatic interfaces of the VNIM may be used by control-plane components of another service of the provider network to manage IGs set up for the other service.

Example System Environment

Figure 7A:
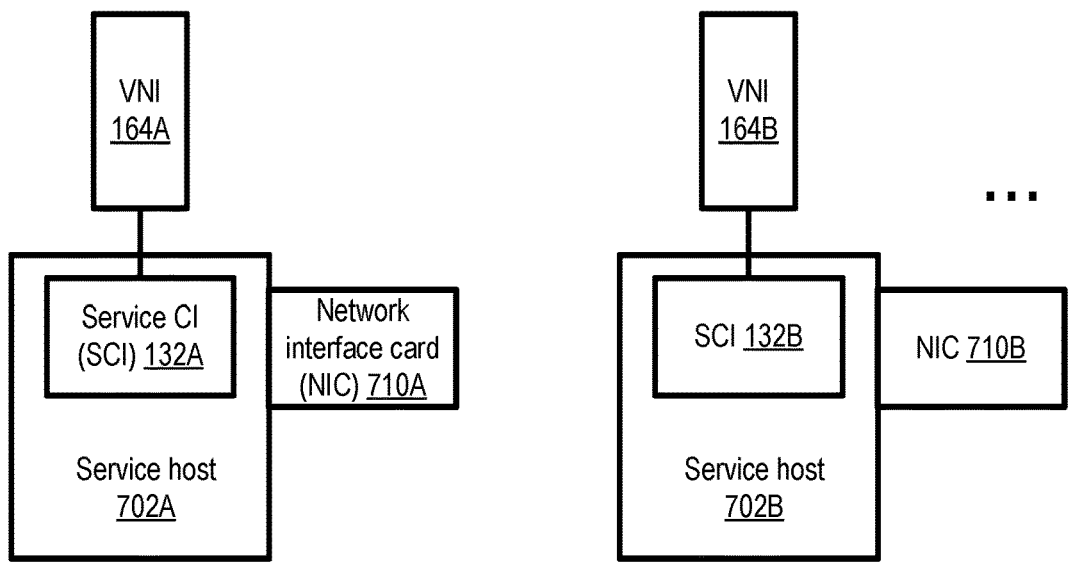
FIGS. 7a, 7b and 7c respectively illustrate three examples of mappings between VNIs, NICs and hosts associated with an interface group, according to at least some embodiments.
Figure 7B:
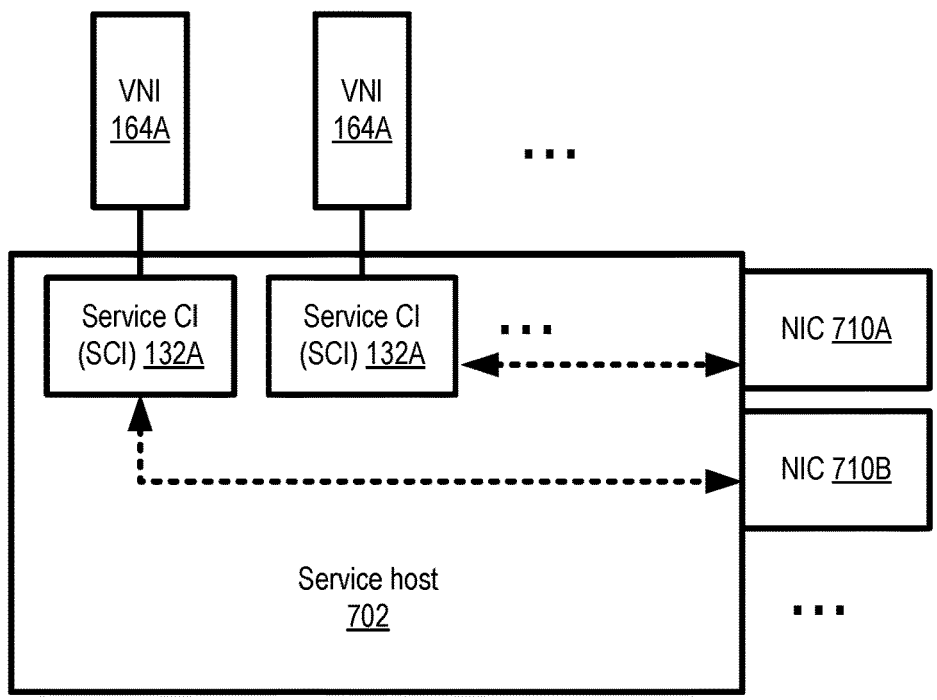
Figure 7C:
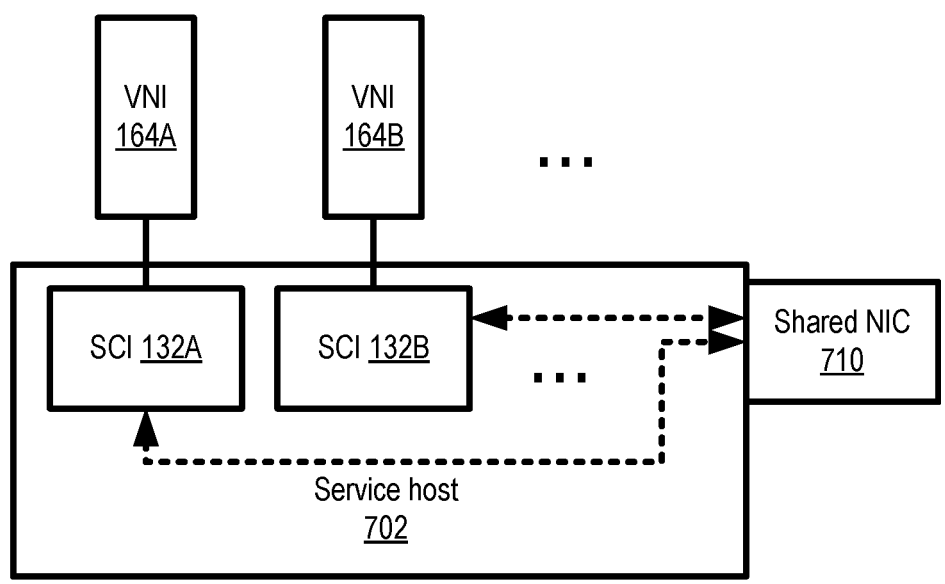

FIG. 1 illustrates an example system environment in which interface groups comprising a plurality of virtual network interfaces (VNIs) associated with a single client-accessible service endpoint address (CSEA) may be established using a VNI multiplexing service of a provider network, according to at least some embodiments. As shown, system 100 comprises a VNI multiplexing service configuration manager 180 that has set up two interface groups (IGs) 150A and 150B. Each IG 150 comprises a plurality of VNIs in the depicted embodiment, and each IG has a respective CSEA 172. IG 150A, for example, includes VNIs 164A, 164B, . . . , 164M, and a CSEA 172A usable by applications running at client compute instances (CCIs) 122A and 122B. IG 150B includes VNIs 164Q and 164R, and has CSEA 172B that is usable by applications running at CCIs 122K, 122L, 122M and 122N. Each VNI 164 is shown attached to a respective service compute instance (SCI) 132 in system 100. For example, VNI 164A is attached to SCI 132A, VNI 164 is attached to SCI 132B, and so on. As described below in further detail with respect to FIG. 2, in at least some embodiments a VNI 164 may represent a collection of networking-related attributes that can be dynamically associated with or disassociated from compute instances such as SCIs 132 via "attach" and "detach" operations respectively. One or more CCIs 122 may be respective guest virtual machines resident at a given client-side instance host 120—for example, CCI 122A and 122B are shown executing at instance host 120A, CCIs 122K and 122L are implemented at instance host 120B, and CCIs 122M and 122N are implemented at instance host 120C. Similarly, one or more SCIs 132 may be respective guest virtual machines running at service-side instance hosts (not shown in FIG. 1). A number of different approaches may be taken to the manner in which the SCIs are distributed among service-side instance hosts in different embodiments and for different use cases. Examples of mappings between service hosts, NICs, and SCIs are illustrated in FIG. 7*a*-7*c* and discussed in further detail below.

Generally speaking, any number of CCIs 122, instantiated at any number of instance hosts 120 of a virtual computing service, may be provided the CSEA (or CSEAs, in embodiments in which multiple client-accessible service endpoint addresses may be assigned to a single IG) of any given IG 150. The CSEAs 172 may, for example, be provided to the CCIs for a service being implemented either at the SCIs 132 to which the VNIs 164 are attached, or at other back-end service nodes (not shown in FIG. 1) for which the SCIs 132 act as intermediaries or request/response distributors. In the example illustrated in FIG. 1, network packets containing service requests, with headers indicating CSEA 172A as the destination for the packets, may be generated at CCIs 122A and/or 122B. Such packets may be referred to as "baseline packets", herein, e.g., to distinguish them from encapsulation packets that may be generated to transmit the contents of the baseline packets on a network path towards the resources at which the service requests are to be processed. In FIG. 1, such encapsulation packets may be generated at respective client-side components 144 of the VNI multiplexing service.

Each client-side component 144, such as client-side component 144A at instance host 120A, client-side component 144B at instance host 120B, and client-side component 144C at instance host 120C, may be provided configuration metadata for the appropriate set of IGs by the configuration manager 180. Thus, for example, after VNIs 164A-164M have been designated as members of IG 150A by the configuration manager 180, a membership list for IG 150A may be provided to client-side component 144A. Similarly, after designating VNIs 164Q and 164R as members of IG 150B, configuration manager 180 may provide a membership list for IG 150B to client-side components 144B and 144C. The membership metadata may include, for example, the identifiers and non-public network addresses of each of the VNIs of the IG; in some cases, the membership metadata may include a target selection policy providing guidance to the client-side components on how traffic should be distributed among the IG's VNIs. In some embodiments, the membership metadata may be provided in response to programmatic requests from the client-side components, e.g., in a request to attach a specified IG to one or more CCIs 122 or to a client-side component 144. Thus, in such embodiments, it may be possible to programmatically attach not just an individual VNI to a given entity, but also or instead to attach an interface group comprising a plurality of VNIs. In some embodiments, VNIs 164 may be added to or removed from IGs 150 over time, e.g., in response to programmatic requests from the clients or services on whose behalf they have been set up, and changes to the membership of the IGs may also be propagated to the client-side components 144. As in the example configuration shown in FIG. 1, the set of client-side components for which a particular IG is established may differ from the set of client-side components for which a different IG is set up. It is noted, however, that in at least some embodiments, multiple IGs may be set up for a given collection of client-side components, and metadata (e.g., membership lists) pertaining to each of the multiple IGs may be propagated to the client-side components of the given collection. In one embodiment, the metadata of a particular IG need not be distributed to all client-side components that are to utilize the IG by the configuration manager 180; instead, for example, the configuration manager may provide the metadata to a subset of the client-side components, and the metadata may be propagated to the remaining client-side components by the members of the subset.

In addition to providing the membership metadata to the client-side components 144, in at least some embodiments the configuration manager 180 may also provide health status updates regarding the set of SCIs 132 of the appropriate IGs 150 to client-side components 144. Such health state information may be obtained, for example, by health monitoring agents 182 from the various SCIs 132, the hosts at which the SCIs are launched, and/or other components of the provider network. In some embodiments, the health state information (or at least changes with respect to previously-provided health state information) may be pushed to the client-side components 144 without requiring explicit health update requests from the client-side components. In other embodiments, a pull model may also or instead be implemented for health status updates, and the configuration manager 180 may respond to explicit health state update requests from the client-side components. The configuration manager 180 and the health monitoring agents 182 may represent control-plane elements of the VNI multiplexing service in the depicted embodiment, while the client-side components 144, the SCIs 132 and the VNIs 164 of the IGs 150 may be considered data-plane components. In some embodiments, the health monitoring agents 182 may be used by a plurality of services of the provider network; for example, the agents 182 may be elements of a general-purpose health monitoring infrastructure of a provider network. In some implementations, the configuration manager 180 may comprise a plurality of software and/or hardware components collaborating to manage at least a subset of the administrative tasks of the VNI multiplexing service.

After the IG membership metadata has been received at the client-side components 144, data-plane operations of the VNI multiplexing service involving the distribution of packets by the client-side components among IG members may begin in the depicted embodiment. In at least one embodiment, as mentioned above, the metadata provided to the client-side components 144 by the configuration manager 180 may include selection rules or policies that can be used to select specific VNIs to which a given packet is to be directed. For example, in one implementation, each VNI 164 of an IG 150 may be assigned a weight to indicate the probability with which that VNI should be selected for any given baseline packet directed to the CSEA 172 of that IG. In other embodiments, the client-side components may implement target selection policies on their own, e.g., without being provided weights or other selection criteria by the VNIM service control plane.

In one embodiment in which at least some service requests that are to be handled using IGs are generated at virtual machines such as CCIs 122, the instance hosts 120 at which those virtual machines are implemented may include virtualization management components (VMCs) such as hypervisors and/or operating systems running in privileged domains (which may be referred to as domain zero or "dom0"). The VMCs may serve as intermediaries between the CCIs and the hardware of the instance hosts, such as physical network interface cards, disk drives, and the like. In such embodiments, the VMCs may comprise the client-side components 144 of the VNI multiplexing service. Upon detecting or intercepting a baseline packet directed at the CSEA assigned to an IG 150, the client-side component 144 may identify, e.g., using a target selection policy associated with the IG, a particular VNI that is a member of the IG as a destination VNI to which the contents of the baseline packet are to be transmitted. The non-public address of the selected VNI may be indicated as the destination address in a header of an encapsulation packet generated at the client-side component, for example, with at least some of the contents of the baseline packet included in the body of the encapsulation packet. As mentioned earlier, although in some embodiments IP address (e.g., IPv4 or IPv6 addresses) may be used as the non-public addresses of the VNIs, other address formats and/or protocols may be used in other embodiments. In one embodiment, the client-side component may also store a connection tracking record indicating the selection of the particular VNI (e.g., indicating the non-public address of the selected VNI). Such tracking records may be used for selecting the same destination address for subsequent packets generated from the same source in some embodiments. In accordance with the destination address indicated in its header, the encapsulation packet may be transmitted to the SCI 132 to which the selected VNI is attached in the embodiment illustrated in FIG. 1. For a different baseline packet, e.g., one generated at a different CCI 122, a different VNI of the same IG may be selected by the client-side component. In this way, the service request workload generated at various CCIs 122 may be distributed among the member VNIs of the IG by the client-side components 144, without having to change any of the applications at which the service requests were generated.

VNI Attributes

Figure 2:
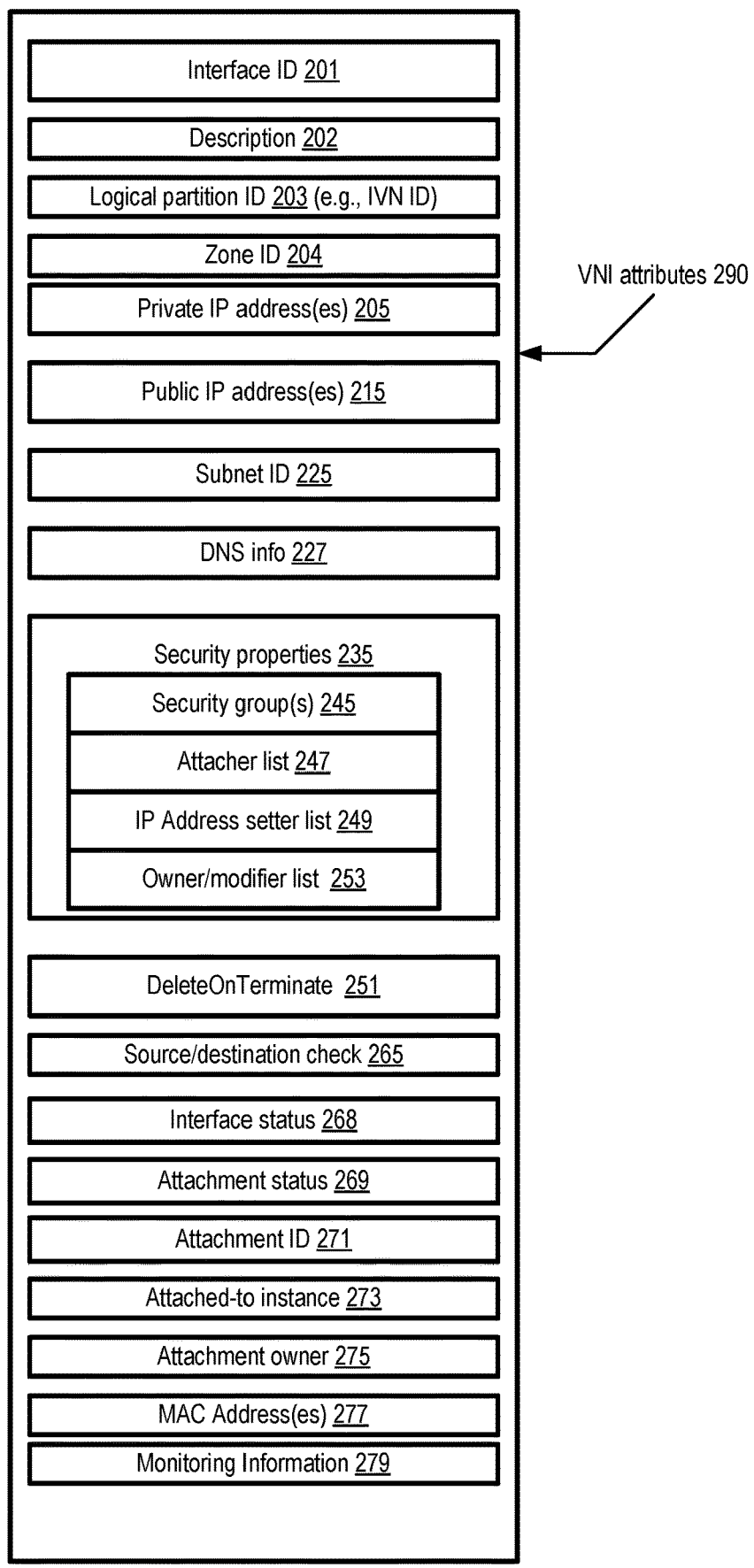
FIG. 2 illustrates examples of attributes that may be associated with a VNI that can be designated as a member of an interface group, according to at least some embodiments.

FIG. 2 illustrates examples of attributes 290 that may be associated with a VNI 164 that can be designated as a member of an interface group, according to at least some embodiments. It is noted that a provider network may include VNIs that belong to interface groups, as well as VNIs that are used in a standalone manner (i.e., VNIs that are not designated as part of any interface group). A generalized list of example attributes is shown in FIG. 2, not all of which may necessarily be used for VNIs that belong to interface groups set up by a VNI multiplexing service. Only a subset of the attributes or properties shown in FIG. 2 may be implemented in some embodiments, and not all the implemented attribute fields may have to be populated (i.e., some of the attributes may be left blank or null). Respective records comprising fields/entries containing the attributes 290 of various VNIs may be stored in a persistent metadata store in some embodiments, e.g., a store that is accessible from various control-plane components of the provider network, including the control-plane components of the VNI multiplexing service.

When a new VNI is created, e.g., in response to a programmatic request from a client of a virtual computing service which supports VNIs, a new interface identifier 201 may be generated for it. In some implementations, a description field 202 may be filled in by the client that requested the creation of the VNI, e.g., "Interface 554 for client group CG-X of file storage service". A provider network in which the VNI is to be used may comprise a plurality of logical partitions in some embodiments, and the attributes 290 may contain a logical partition identifier 203 in such cases. For example, the operator of the provider network may establish an isolated virtual network (IVN) for a particular customer by setting aside a set of resources for exclusive use by the customer, with substantial flexibility with respect to networking configuration for that set of resources being provided to the customer. The identifier of such an isolated virtual network (which may alternatively be referred to as a virtual private cloud or VPC of the customer) may be indicated as the logical partition identifier 203 for a VNI. In some cases the attributes may include a zone identifier 204, which may for example indicate a geographical region or set of data centers whose compute instances may be available for attachment to the VNI.

Any of several types of network addressing-related fields may be included within the set of attributes of a VNI in different embodiments. One or more private IP addresses 205 may be specified in some embodiments, for example. Such private IP addresses, also referred to herein as non-public addresses, may be used internally for routing within the provider network (e.g., for encapsulation packets generated by client-side components of the VNI multiplexing service), and may not be directly accessible from outside the provider network or to at least some client applications running on CCIs. In some embodiments, at least some non-public IP addresses associated with a VNI may not be IP addresses; that is, addressed formatted according to a proprietary protocol of the provider network may be used, or addresses formatted according to a different public-domain protocol may be used. In general, zero or more public IP addresses 215 may also be associated with VNIs in some embodiments; these IP addresses may be visible outside the provider network, e.g., to various routers of the public Internet or peer networks of the provider network. However, in at least some embodiments, public IP addresses may not be used for VNIs that are included in IGs which have CSEAs 172 assigned to them. One or more subnet identifiers 225 (e.g., expressed in Classless Inter-Domain Routing or CIDR format) may be included within attributes 290 in some embodiments, such as identifiers of subnets set up by a client within an IVN in which the VNI is to be used. In one embodiment an identification of a Domain Name Server (DNS) responsible for propagating address(es) associated with the VNI, or other DNS-related information 227, may be included in the attributes 290 as well.

In some embodiments the attributes 290 may include security-related properties 235. Some provider networks may allow users to specify rules, including for example firewall-related rules, for the types of incoming and/or outgoing traffic allowed at compute instances to which a VNI may be attached. Such rules may be termed "security groups" and identified via security group(s) fields 245. Various port and protocol restrictions may be enforced using such rules, and multiple rules may be associated with each VNI. For example, a client may use security groups to ensure that only HTTP and HTTPs outgoing or incoming traffic is allowed, to limit the set of TCP or UDP ports to which traffic is permitted, to filter incoming and outgoing traffic according to various policies, and so on. In some implementations an attacher list 247 may be specified, indicating which users or entities are allowed to request attachments of the VNI to compute instances. In some cases a separate detacher list may be used to specify which entities can detach the VNI, while in other cases a single list such as attacher list 247 may be used to identify authorized attachers and detachers. The collection of users or entities that are allowed to set or modify IP addresses (e.g., public IP addresses 215 and/or private IP addresses 205) of the VNI may be provided in IP address setter list 249, and the set of users or entities that own (or can modify various other fields of) the VNI may be specified in owner/modifier field 253 in some embodiments. For example, an owner/modifier identified in field 253 may be permitted to change the attacher list 247 or the IP address setter list in some implementations, thus changing the set of entities permitted to attach or detach the VNI or modify its IP address(es). While the term "list" has been used for fields 247, 249, and 253, logical data structures other than lists (such as arrays, hash tables, sets and the like) may be used to represent the groups of entities given various security privileges, roles and/or capabilities in various embodiments.

In some embodiments, users of the virtual computing service of a provider network may be allowed to "terminate" compute instances 120. For example, a client may set up compute instances, attach VNIs to the instances, run a desired set of computations on the instances, and then issue a request to terminate the instances when the desired computations are complete. In such embodiments, a "DeleteOnTerminate" setting 251 may be used to specify what happens to attached VNIs when a compute instance is terminated. If DeleteOnTerminate is set to "true" for a VNI attached to the instance being terminated, the VNI may be deleted (e.g., a persistent record comprising attributes 290 for the VNI may be removed from the repository in which it was being stored). If DeleteOnTerminate is set to "false", the VNI may be retained, so that for example it may be attached again to some other compute instance. In one embodiment, when a VNI is attached to a compute instance, an attachment record separate from the VNI attributed 290 may be created to represent that relationship, and the DeleteOnTerminate property may be associated with the attachment record instead of or in addition to being associated with the VNI itself. In such an embodiment, the VNI's attributes 290 may include a reference or pointer to the attachment record or records for each of the attachments in which the VNI is currently involved, and different values of "DeleteOnTerminate" may be set for each attachment record.

In one embodiment, the attributes 290 may contain routing-related information such as an indication 265 of whether a source and/or destination check is to be performed for network packets transmitted to a compute instance to which the VNI is attached. If the source/destination check setting is set to "false" or "off", routing decisions may be made based on a packet's source and destination IP addresses, e.g., the packet may be forwarded from one subnet to another; and if the setting is "true" or "on", the compute instance may not perform routing in some embodiments. Thus the source/destination field 265 may be used in some embodiments to control whether a compute instance to which the VNI is attached performs routing or gateway functions on packets for which it is not the final destination, or whether it ignores such packets. Other types of routing-related information, such as route table entries, may also or instead be included in attributes 290 in other embodiments. Billing-related information may be included in attributes 290 in some implementations, identifying for example the entity or user to be billed for network traffic associated with the VNI. In some implementations customers may be billed at least partially based on the number of VNIs they create, independently of how many of the instance records are attached to resource instances; in other implementations billing may include both recurring charges (e.g., based on the number of VNIs and/or the number of VNIs attached) and non-recurring charges (e.g., based on traffic flow measurements).

The interface status field 268 may be used to indicate a current state of the VNI—e.g., whether the VNI is "available", "disabled", or "in-repair". Similarly, the attachment status field 269 may be used to indicate whether the VNI is currently attached, detached or in the process of being attached or detached in some embodiments. In one implementation, as described above, a record of an attachment may be created at the time the corresponding attachment operation is performed, and an identifier or identifiers of the current attachments of the VNI may be stored in attachment id field 271. Identifiers of the compute instance or instances to which the VNI is currently attached may be stored in attached-to instance field 273, and the user or entity that requested the attachment may be identified via attachment owner field 275 in some embodiments. In one embodiment, a list of identifiers of the NIC or NICs 110 currently usable for traffic directed to/from the IP addresses of the VNI may be maintained, e.g., in the form of a MAC address(es) field 277. In some implementations, monitoring information 279, such as statistics about the amount of traffic flowing to or from the IP addresses of the VNI, may also be retained among attributes 290. Other fields not shown in FIG. 2 may be included in various embodiments.

In one embodiment, some of the fields shown in FIG. 2 may be replaced by references or pointers to other objects. For example, security information for a VNI may be stored in a separate security object, and the attributes 290 may include a reference to the security object. Similarly, each attachment of a compute instance to a VNI 164 may be represented by an attachment object, and the attributes 290 may include pointers to the appropriate attachment objects in some implementations.

Trunked VNIs

Figure 3:
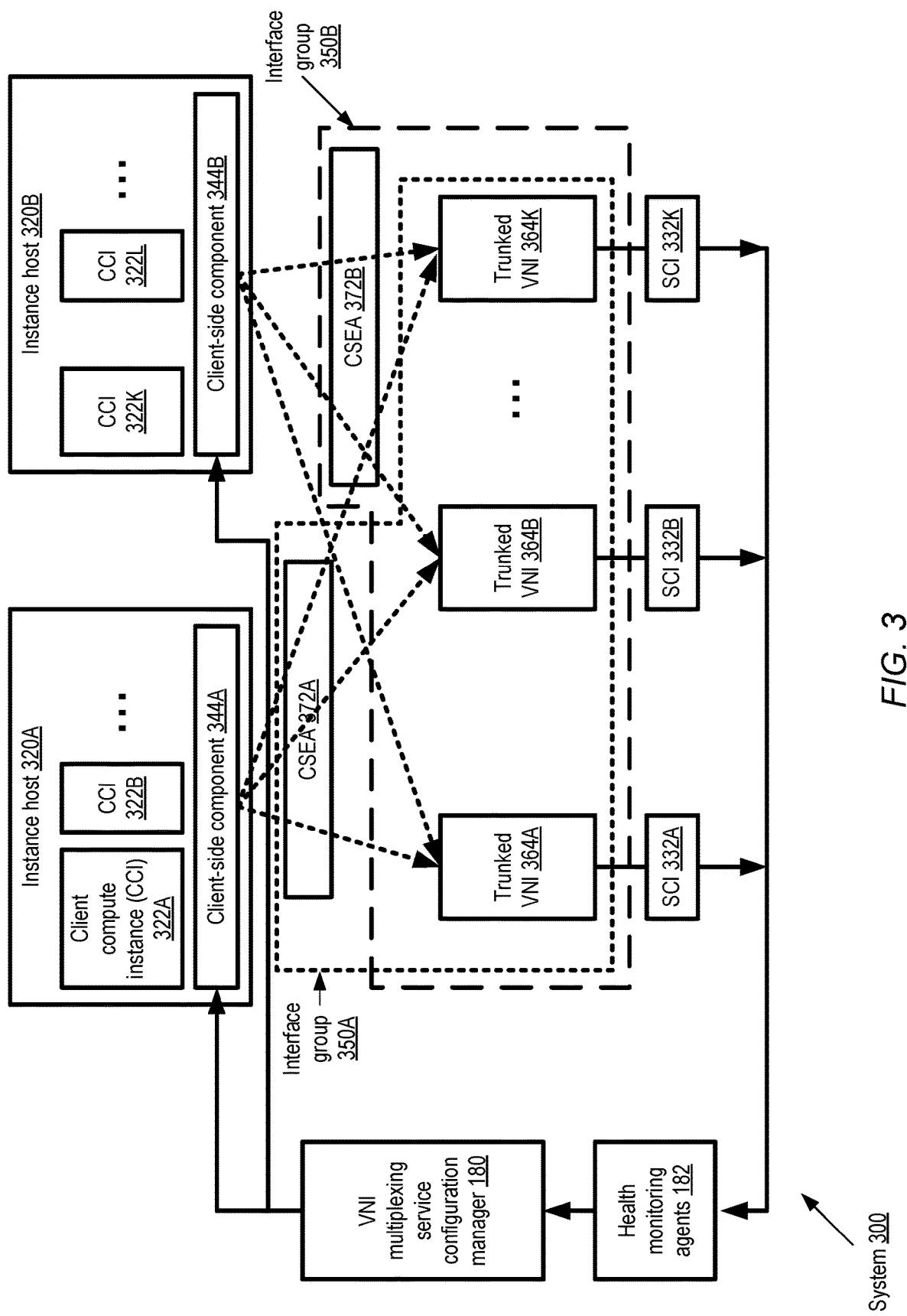
FIG. 3 illustrates an example system environment in which VNIs configured to handle traffic associated with several different CSEAs may be included in an interface group, according to at least some embodiments.

In the embodiment illustrated in FIG. 1, each VNI is a member of a single interface group, and is selected as a destination for encapsulation packets derived from baseline packets that were originally targeted towards a single C SEA. FIG. 3 illustrates an example system environment 300 in which VNIs configured to handle traffic associated with several different CSEAs may be included in an interface group, according to at least some embodiments. Such VNIs may be referred to as "trunked" VNIs herein. In system 300, three trunked VNIs 364A-364K are shown. Each of the three VNIs is shown as a member of two different interface groups, 350A and 350B. Interface groups 350A and 350B are respectively assigned CSEAs 372A and 372B.

Interface group 350A may have been set up to handle client requests generated at a first set of client compute instances, and interface group 350B may have been established for client requests generated at a different set of CCIs. Membership metadata pertaining to IG 350A may be propagated by configuration manager 180 to client-side components 344A, for example, while membership metadata pertaining to IG 350B may be transmitted to client-side component 344B in the example configuration shown. Similarly, health state information for the SCIs 332A-332K may be passed on from health monitoring agents 182 to the configuration manager 180, and from the configuration manager 180 to the client-side components. In some cases, IG 350A may have been established on behalf of one customer, while IG 350B may have been established on behalf of a different customer. In some embodiments in which the VNIs of a given IG are shared among different clients in a multi-tenant fashion, a delegated security model that requires agreement regarding the sharing of resources among the clients involved may be used. For example, each of the customers or clients whose traffic is to be directed using the multi-tenant trunked VNIs 364 may have to agree to share rights to the VNIs. In one implementation, for example, one client may be identified as the attachment owner 275 (indicated in the metadata 290 of FIG. 2) of a given VNI, but may have to delegate or share ownership with the other clients whose traffic is to utilize the VNI. In addition, other operations involving trunked VNIs, such as transferring such VNIs among interface groups or deleting such VNIs, may have to be coordinated among multiple clients in some embodiments. In one embodiment, trunked VNIs may be used only for a single client at a time (e.g., for a single customer that wishes to use multiple interface groups for different sets of their CCIs), in which case the coordination of such changes and of VNI ownership may not be required.

In the configuration shown in FIG. 3, baseline packets comprising service requests generated at CCIs 322A and 322B at instance host 320A, and indicating CSEA 372A as the destination, may be intercepted at client-side component 344A. Using the membership metadata and/or health state updates provided by the configuration manager 180, client-side component 344A may distribute encapsulation packets comprising the contents of the baseline packets among the VNIs 364A-364K of IG 350A. Similarly, with respect to baseline packets generated at CCIs 322K and 322L of instance host 320B and directed to CSEA 372B, client-side component 344B may also distribute the corresponding encapsulation packets among VNIs 364A-364C. Each client-side component 344 may maintain connection tracking records indicating which specific VNI was selected as a destination for which baseline packet sources, so that, for example, the same destinations can be selected as destinations for subsequent baseline packets from the same sources. In at least some embodiments, the encapsulation packet headers may include one or more additional fields in the case of trunked VNIs (e.g., identifying which interface group or CSEA a given packet is associated with) than in the case of un-trunked VNIs such as those shown in FIG. 1. Using encapsulation headers to manage trunking may enable the VNI multiplexing service to overcome various constraints (e.g., limited numbers of slots available for data structures representing network interfaces) in the virtualization management stacks and/or operating system stacks at the hosts at which the SCIs 332 are instantiated in some embodiments.

It is noted that at least in some embodiments, trunking (i.e., the association of multiple CSEAs with the same VNI) may be used in scenarios in which multiple VNIs are not aggregated into interface groups as shown in FIG. 3. For example, a single VNI may be assigned two or more CSEAs, without being designated a member of an IG. Also, as was indicated in FIG. 1, interface groups may be set up without using trunked VNIs in at least some embodiments. Thus, the respective techniques of combining multiple VNIs into interface groups, and of assigning multiple addresses to a given VNI, may be used independently of one another, and/or in combination with each other, in at least some embodiments.

Client-Side Components

Figure 4:
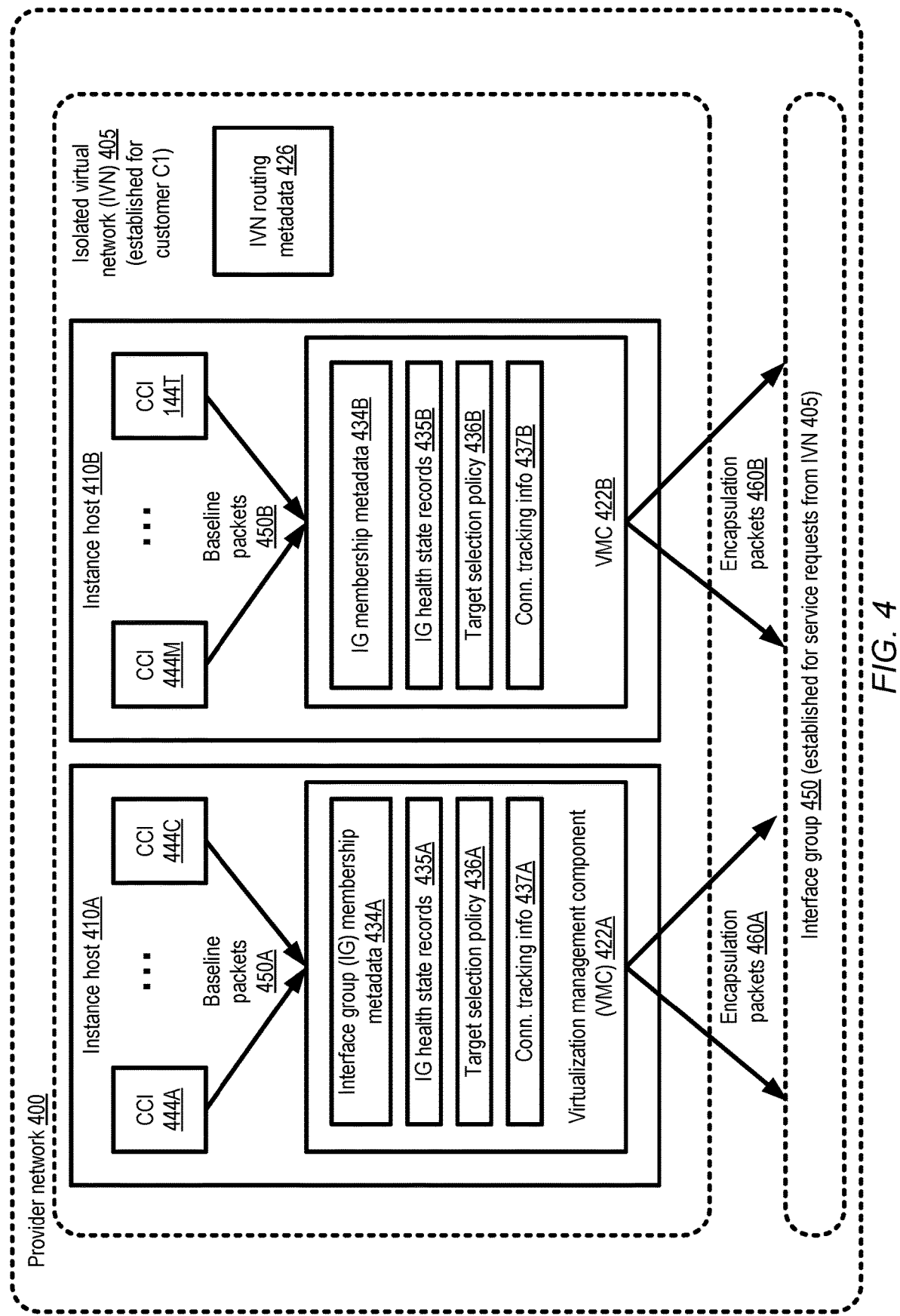
FIG. 4 illustrates examples of client-side virtualization management components that may distribute baseline packet contents among VNIs of an interface group using encapsulation, according to at least some embodiments.

As mentioned earlier, client-side components of the VNI multiplexing service may be implemented at several entities/devices of a provider network, including, for example, virtualization management layers of instance hosts as well as edge networking devices. FIG. 4 illustrates examples of client-side virtualization management components of instance hosts that may distribute baseline packet contents among VNIs of an interface group using encapsulation, according to at least some embodiments. In the depicted embodiment, provider network 400 may include several isolated virtual networks (IVNs) include IVN 405. An IVN 405, as indicated earlier, may comprise a collection of computing and/or other resources in a logically isolated section of the provider network 400, which may be established at the request of a particular customer (such as customer C1 in the case of IVN 405) of a virtual computing service of the provider network. The customer may be granted substantial control with respect to networking configuration for the devices included in the IVN. In some embodiments, for example, a customer may select the IP (Internet Protocol) address ranges to be used for VNIs to be attached to various compute instances, manage the creation of subnets within the IVN, and the configuration of routing metadata 426 (e.g., including one or more route tables associated with respective subnets) for the IVN. Routing metadata 426 may include route table entries that indicate CSEAs as the destinations for some types of packets in some embodiments, and such entries may be used by the client-side components 422 to identify which packets are to be distributed among member VNIs of an IG to which a CSEA is assigned. In some embodiments, resources that are to be used to perform the operations of one or more other services (e.g., a file storage service, or a database service) implemented at the provider network may also be organized in one or more IVNs.

In the configuration shown in FIG. 4, an interface group 450 has been established for service requests generated at IVN 405. Additional IGs may be set up for requests generated at different IVNs in the depicted embodiment. In some embodiments, the interface group 450 may be set up within a different IVN established for a particular service for which work requests are expected from customer CI's instances; thus, the sources of a set of baseline packets may be in one IVN, while the service requests indicated in the baseline packets may be fulfilled at a different IVN. Baseline packets 450 comprising service requests may be generated at the CCIs 444 of IVN 405. For example CCIs 444A-444C at instance host 410A may generate baseline packets 450A, while CCIs 444M-444T at instance host 410B may generate baseline packets 450B. The virtualization management components (VMCs) 422 (e.g., subcomponents of a hypervisor and/or a privileged-domain or dom0 operating system instance) may intercept the baseline packets 450 at each of the instance hosts. The VMCs 422A and 422B may store respective IG membership metadata 434 (e.g., metadata 434A and metadata 434B) as well as IG health state records 435 (e.g., records 435A and 435B), that may have been received from control-plane components of the VNI multiplexing service such as a configuration manager 180.

In the depicted embodiment, each of the VMCs may also store a record of a target selection policy 436, such as policy 436A or 436B. In some implementations, at least an initial version of the target selection policy may have been provided by the VNI multiplexing service's control plane components to the VMCs (and to other client-side components). For example, when the IG 450 was established or when VNIs were added to IG 450, respective initial weights may have been assigned to each of the member VNIs, indicative of the desired probability (e.g., from the perspective of the service for which the IG is set up) of selecting a given VNI as a destination for an encapsulation packet. Such initial weights may have been propagated to the client-side components such as VMCs 422 to indicate a target selection policy, together with or as part of the membership metadata. In at least some embodiments, the target selection policies 436 may be modified over time, and may differ from one client-side component to another. For example, in one embodiment, the client-side components such as VMCs 422 may obtain performance metrics indicating the responsiveness of each of the IG's members, and may decide to select target IVNs based on such metrics. In implementations in which respective weights are assigned to VNIs of an IG, such weights may be modified programmatically over time. Health status updates may also influence the selection of destination VNIs by the VMCs 422 in at least some embodiments. For example, as one or more failures of VNIs or the SCIs to which they are attached are reported, the VMCs 422 may decide to transmit subsequent encapsulation packets to still-healthy subsets of the IG resources. In one embodiment, if the fraction of failed components of an IG exceeds a threshold, however, all the components of that IG may be marked as being healthy in records 435, and encapsulation packets may again be transmitted to all the non-public addresses of the VNIs of the IG. In at least some embodiments, the VMCs may maintain connection tracking information 437 (e.g., 437A or 437B), which can be used to continue directing packets of a given long-lasting connection, sequence or flow originating at a given source CCI to the same destination VNI of IG 450. In other embodiments, connection tracking information may not necessarily be stored at client-side components resident at instance hosts 410. In at least one embodiment, the same destination VNI may be selected deterministically for multiple packets belonging to a given logical flow without using stored connection tracking information. In one such embodiment, a flow hashing technique may be used in which the destination is selected based on the result of applying a hash function to some combination of headers of a baseline packet, where the header values are expected to remain the same for different baseline packets of the flow. In one example implementation of flow hashing for TCP packets, headers containing the source IP address, the destination IP address, the source TCP port and/or the destination TCP port may be used as inputs to the hash function.

Figure 5:
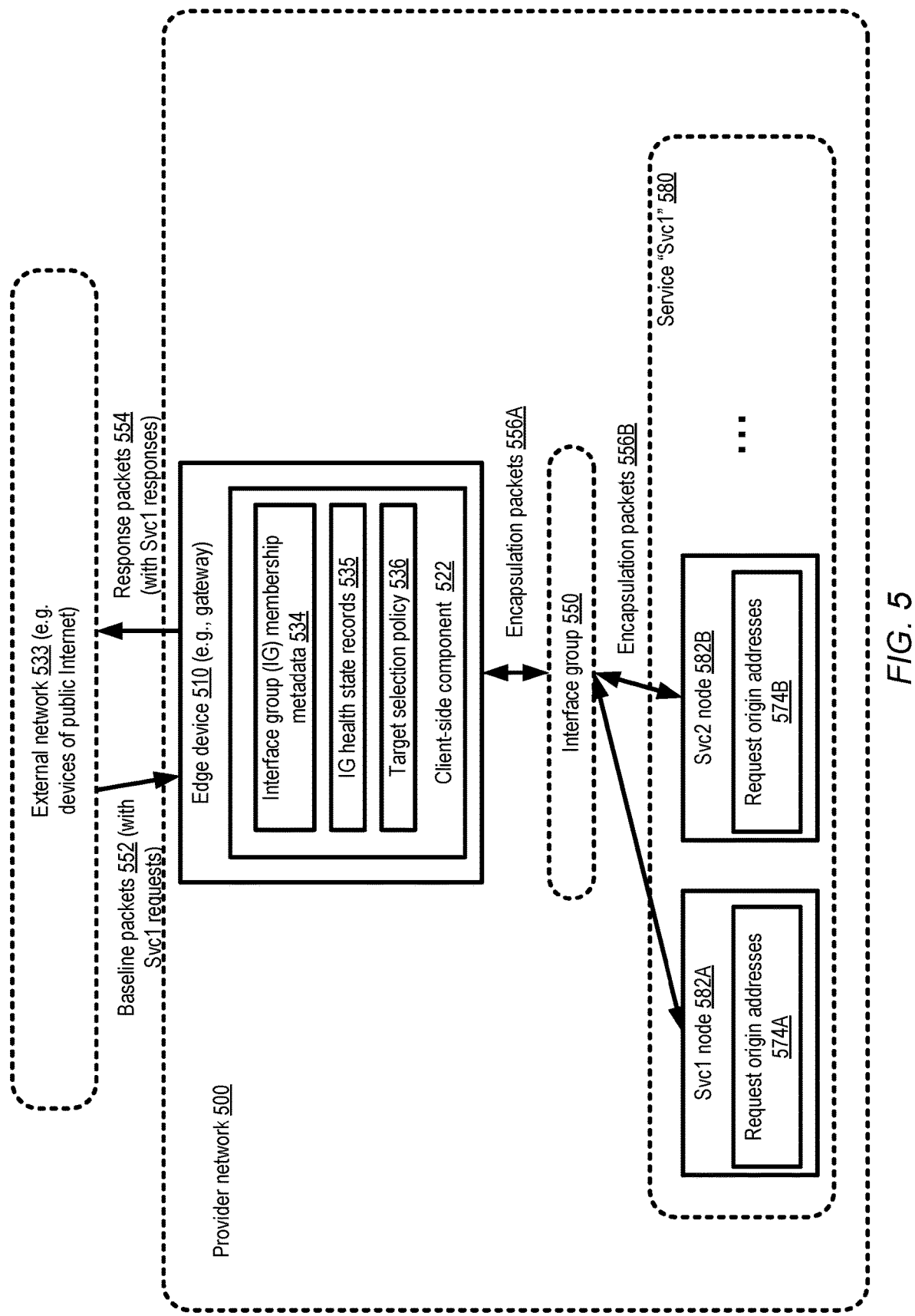
FIG. 5 illustrates an example of an edge networking device which may distribute baseline packet contents among VNIs of an interface group, according to at least some embodiments.

FIG. 5 illustrates an example of an edge networking device which may distribute baseline packet contents among VNIs of an interface group, according to at least some embodiments. In the example configuration shown, the operations of a service Svc1 580 of a provider network 580 are implemented at a set of back-end nodes 582, such as nodes 582A and 582B. To handle service requests originating at an external network 533, which may for example include devices connected to the public Internet or devices of one or more client-owned premises, an interface group 550 has been established. Baseline packets 552 with Svc1 requests may be transmitted from the devices of the external network 533 over various combinations of network links to an edge device 510 of the provider network 500, such as a gateway or an edge router. Such edge devices may also be referred to herein as edge nodes of the provider network 580. The baseline packets 552 may, for example, indicate a CSEA (e.g., publicly-advertised IP address) of Svc1 as their destination.

At edge device 510, a client-side component 522 of the VNI multiplexing service may store local versions of IG membership metadata 534, IG health state records 535, and/or a target selection policy 536 in the depicted embodiment. In some embodiments, respective sets of metadata pertaining to a number of different IGs set up in provider network 500 to handle requests from external networks such as network 533 may be propagated to various edge devices 510 of the provider network by control-plane components of the VNI multiplexing service. Upon detecting baseline packets that are directed to IGs for which metadata is available locally, the client-side component 522 may generate corresponding encapsulation packets 556A and distribute the encapsulation packets to the member VNIs of IG 550. An encapsulation packet may include the address of the source from which the baseline packet was generated, which may be referred to herein as the "request origin address". In turn, the SCIs to which the VNIs of IG 550 are attached may transfer encapsulation packets 556B to selected service back-end nodes 582. In some embodiments, two different encapsulation protocols may be used: one at the edge node 510, and one at the SCIs of the IG 550. In other embodiments, the same encapsulation protocol may be used for both sets of encapsulation packets 556A and 556B, but the destination address headers may be modified by the SCIs of IG 550 to direct the 556B packets to the appropriate service nodes 582. In one embodiment, connection tracking information analogous to that illustrated in FIG. 4 may also be maintained at the client-side component 522 at edge device 510. In some embodiments, flow hashing (discussed above in the context of FIG. 4) or other similar techniques for consistent selection of destinations for packets of a given logical flow without using stored connection tracking information may be employed at edge devices 510.

In at least one embodiment, the service nodes 582 may extract, from the encapsulation packets 556B, request origin addresses 574 of the devices at which the corresponding service requests originated in external network 533. When the work indicated in a service request is completed and a response is to be transmitted, the service nodes 582 may include the corresponding request origin address in a response encapsulation packet directed back to the IG 550. The SCI that receives the response encapsulation packet 556B may in turn transmit a corresponding response encapsulation packet 556A comprising the request origin address to the client-side component 522 at edge node 510. The client-side component 522 may extract the response content and transmit an un-encapsulated response packet 554 to the request origin address.

Control-Plane Interactions

Figure 6:
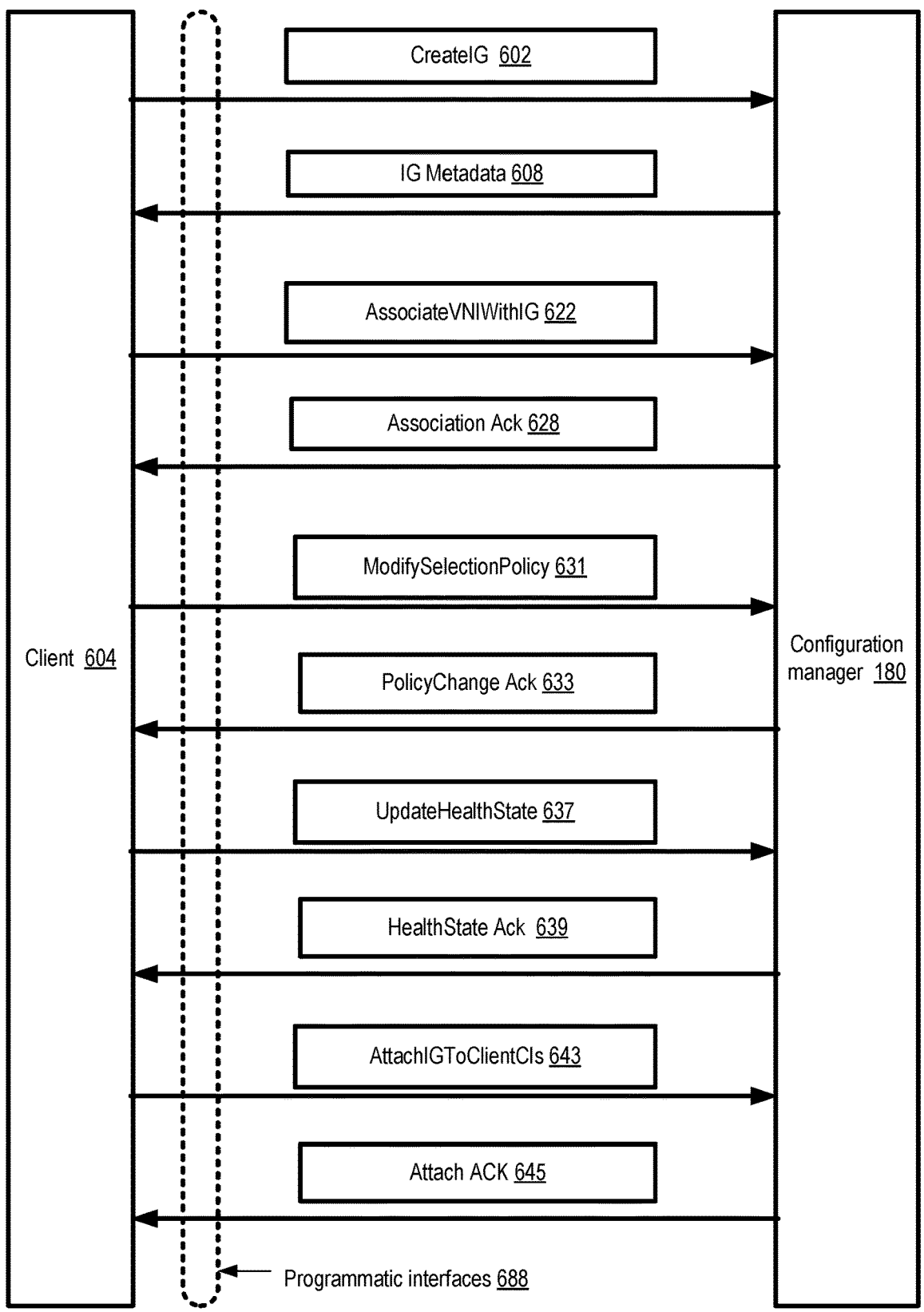
FIG. 6 illustrates examples of programmatic control-plane interactions between a client and a VNI multiplexing service, according to at least some embodiments.

FIG. 6 illustrates examples of programmatic control-plane interactions between a client and a VNI multiplexing service, according to at least some embodiments. As shown, a set of programmatic interfaces 688 (e.g., application programming interfaces (APIs), a web-based console, command line tools or standalone GUIs (graphical user interfaces)) may be used by clients 604 to submit various types of configuration requests to a configuration manager 180 of the service, and to receive corresponding responses. In some cases, the programmatic interfaces 688 may be used by administrators or control-plane components of other services being implemented at a provider network at which the VNI multiplexing service is supported. In other cases, end-users or customers of the provider network's services may utilize programmatic interfaces 688.

In the embodiment depicted in FIG. 6, a CreateIG request 602 may be submitted programmatically to the configuration manager 180, indicating one or more properties of an interface group to be established on behalf of the client. The properties may include, for example, some combination of the number of VNIs to be included, the desired mappings between VNIs and physical resources such as instance hosts, network interface cards and the like, a target selection policy for the IG, and/or one or more VNI-specific attributes such as those illustrated in FIG. 2 for the member VNIs. In some embodiments, a CreateIG request may not indicate any VNI-specific details, and may simply be used to create a placeholder object representing an IG, whose properties may be set later using other programmatic requests. Upon receiving the CreateIG request 602, the configuration manager may validate the request (e.g., by performing one or more authentication/authorization checks) and create the requested IG (e.g., generate and store configuration information corresponding to the IG in a service repository). If, for example, the CreateIG request indicated details regarding the number and attributes of member VNIs, the required VNIs may be generated and configured as requested. Assuming that the IG is created successfully, metadata 608 pertaining to the created IG (e.g., a unique identifier of the IG) may be returned to client 604 in response to the CreateIG request.

An AssociateVNIWithIG request 622 may be used to request the designation of a specified VNI (e.g., a VNI that was created earlier in response to a different programmatic request) as a member of an existing IG in some embodiments. In response, the configuration manager 180 may modify the IG's saved membership information accordingly, and transmit an association acknowledgement 628 to the client. In response to a ModifySelectionPolicy request 631, the rules, weights and/or other aspects of a target selection policy to be used to select individual VNIs of the IG as destinations by client-side components may be modified, and a policy change acknowledgement 633 may be provided to the client.

In some embodiments, programmatic interfaces 688 may be used to submit requests to update health state information pertaining to specified IGs. In response to such an UpdateHealthState request 637, the configuration manager may in some implementations transmit, to the client-side components associated with the specified IG, the most recently obtained health state information for the service compute instances to which the VNIs of the specified IG are assigned. In some implementations, upon receiving the UpdateHealthState request, the configuration manager may direct health state monitors to obtain fresh health state information, and transmit the results of the newly-performed health checks to the client-side components. In the embodiment depicted in FIG. 6, an acknowledgement 639 indicating that the health state information has been propagated may be provided to the client. In at least one embodiment, in addition to propagating the health state information to the client-side components, the configuration manager 180 may also include the health status information in the acknowledgement 639 provided to client 604.

In one embodiment, a client may request that an IG (e.g., one created earlier in response to a CreateIG request) be attached programmatically to one or more specified client compute instances. In response to such an AttachIGToClientCIs request 643, the configuration manager may store a record of an association of the IG with the specified set of client CIs, and propagate the IG metadata to the corresponding client-side components (such as VMCs at the instance hosts at which the client CIs are instantiated). In at least one embodiment, one or more additional VNIs may be created to represent the IG at the instance hosts, and attached to the specified client CIs. After metadata representing the completion of the requested attach operation(s) is generated and stored, the configuration manager may send an attach acknowledgement 645 to the client. In some embodiments, similar requests to attach an IG to an edge node of the provider network may also be supported.

In at least some embodiments, a number of additional control-plane request types, not shown in FIG. 6, may be supported by the VNI multiplexing service. For example, requests to describe (list various properties of) an interface group, or to describe specific VNIs of an interface group, may be supported in at least some embodiments. In addition, requests to delete IGs or VNIs, or transfer VNIs from one IG to another, may be supported. Security-related requests, such as requests to allow or prohibit multi-tenancy using trunked VNIs, or to delegate security-related roles from one client to another, may be supported in various embodiments. In at least one embodiment, a client may have to transmit a programmatic request indicating an approval of a multi-tenant mode of operation of a specified VNI (or of an instance host at which a VNI is attached), e.g., before traffic generated on behalf of a plurality of clients of the VNIM service can be directed to the VNI (or instance host). Some of the types of requests shown in FIG. 6 may not be supported in at least one embodiment.

Mappings Between VNIs, NICs and Hosts

Depending on the performance and/or isolation requirements associated with an interface group, different approaches may be taken with respect to the manner in which the traffic associated with an interface group is distributed among hardware devices such as physical network interface cards (NICs) in various embodiments. FIGS. 7a, 7b and 7c respectively illustrate three examples of mappings between VNIs, NICs and hosts associated with an interface group, according to at least some embodiments. In the context of FIG. 7a-7c, the term "service host" is used for the instance hosts at which service compute instances (to which the VNIs of an interface group are attached) are run as respective virtual machines.

In the approach illustrated in FIG. 7a, the VNIs 164 of an interface group are each attached to a compute instance that is launched at a different service host with at least one NIC. Thus, VNI 164A is attached to service compute instance 132A running at a service host 702A that has at least one NIC 710A, while VNI 164B is attached to service compute instance 132B running at a different service host 702B with at least NIC 710B. Such a mapping between VNIs, NICs and service hosts may be referred to as a 1:1:1 VNI:NIC:Host mapping. Assigning a respective NIC to the traffic directed to each VNI may allow very high aggregate bandwidths for the interface group as a whole to be supported in some embodiments. The 1:1:1 mapping may also be selected in at least some embodiments for at least some trunked VNIs (e.g., VNIs that are expected to handle traffic associated with multiple client-accessible IP addresses).

In a second approach, shown in FIG. 7b, an N:N:1 VNI:NIC:Host mapping is shown. In this approach, although several of the service compute instances to which several VNIs of a given instance group are attached may be run on the same service host, each VNI may be associated with a respective NIC. Thus, VNI 164A is attached to SCI 132A at service host 702, and VNI 164B is attached to a different SCI 132B at the same service host. Service host 702 has at least two NICs 710A and 710B, respectively used for traffic associated with each of the VNIs. N:N:1 mappings may be used, for example, in environments in which many of the service hosts that can be used for SCIs have multiple NICs attached to them and the service hosts have high computational capacities (e.g., enough capacity to handle several different service compute instances), in scenarios in which the bandwidth requirements for different VNIs are expected to be relatively high.

In the approach illustrated in FIG. 7c, N different VNIs of a given interface group may be attached to SCIs running at the same service host, and one or more NICs of the service host may be shared for traffic directed to the N VNIs. As shown, VNIs 164A and 164B are attached respectively to SCIs 132A and 132B. Both SCIs run at the same service host 702, and NIC 710 is used for traffic directed to both VNIs. This kind of approach may be referred to as an N:1:1 VNI:NIC:Host mapping. An N:1:1 mapping may be appropriate, for example, when the shared NIC has a higher bandwidth capacity than is expected to be required for any given VNI.

In at least some embodiments, variations on the mappings between VNIs, NICs, and hosts shown in FIG. 7a-7c may be used. For example, an N:M:1 mapping may be used in one embodiment, in which the traffic of N VNIs is distributed among M NICs (where M is a different integer than N) at a given instance host. An N:M:1 mapping may be considered a hybrid of the N:1:1 mapping shown in FIG. 7c and the N:N:1 mapping shown in FIG. 7b. In some embodiments, multiple NICs may be used for a single VNI, e.g., a 1:N:1 mapping may be used. In at least one embodiment, the mappings to be used for a given set of service clients may be selected based on an indication of the expected performance requirements for an interface group. Such performance requirements may be indicated programmatically to the VNI multiplexing service in some embodiments, e.g., at the time that the interface group is established or at some later point. In some embodiments, the configuration manager of the VNI multiplexing service may initially utilize one mapping approach between VNIs, NICs and hosts for a given interface group, but may later add VNIs that are set up based on a different mapping approach, or may transfer VNIs to different SCIs to modify the mappings. In at least one embodiment, explicit programmatic approval may be required from the clients involved before a given resource of the VNI multiplexing service (such as a VNI, an SCI, a NIC, or an instance host) is used in a multi-tenant mode (e.g., for the network traffic of several different clients).

Methods for Multiplexing VNIs

FIG. 8 is a flow diagram illustrating aspects of operations that may be performed by control-plane components (such as a configuration manager) of a VNI multiplexing service, according to at least some embodiments. As shown in element 801, the control-plane components may instantiate a group of service compute instances (SCIs) to handle service requests of a particular service Svc1 implemented at a provider network from some set of clients. The SCIs may either implement the service functionality themselves, or may be intended to serve as intermediaries that transmit received service requests to other back-end nodes of Svc1 at which the bulk of the service functionality is to be implemented. One or more VNIs attached to the SCIs may be designated as members of an interface group (IG) (element 804). At least one client-accessible service endpoint address (CSEA) (e.g., an IP address) associated with Svc1 may be assigned to the interface group (either at the time that the interface group is established, or at some later point prior to initiating the use of the interface group for client requests). The interface group may be set up to distribute service requests of Svc1 clients, directed to Svc1's CSEA (as well as the responses to such requests), among the member VNIs and the SCIs to which the member VNIs are attached. In at least some embodiments, one or more of the VNIs may be "trunked", that is, configured to receive packets directed to more than one CSEA associated with Svc1.

The control plane components may identify a set of client-side components of the VNI multiplexing service to which membership metadata of the IG is to be propagated (element 807). The membership metadata may be used by the client-side components to generate encapsulation packets containing contents of baseline packets generated by Svc1 clients, with destination headers of the encapsulation packets containing private addresses of selected VNIs of the IG (e.g., instead of the CSEA assigned to the IG). Using such an encapsulation protocol, the work requests directed to Svc1 may be distributed by the client-side components themselves, without for example utilizing special-purpose load balancer appliances. The client-side components may include, for example, virtualization management components (VMCs) at instance hosts where client compute instances are run, and/or edge devices such as gateways/routers of the provider network at which Svc1 requests may be received from external networks. In at least one embodiment, the set of client-side components expected to use the IG may be indicated (e.g., either explicitly or implicitly) in a programmatic request to set up the IG. In other embodiments, the client-side components may be indicated by specifying one or more client compute instances to which the IG as a whole is to be programmatically attached. Metadata indicative of the initial membership of the IG may be transmitted to the client-side components that are expected to utilize the IG (element 810) in the depicted embodiment. In at least one embodiment, the control-plane components may also propagate at least an initial target selection policy that can be used to select specific VNIs as targets for various encapsulation packets by the client-side components. A variety of selection policies may be used in different embodiments, such as weight-based policies in which each member VNI is assigned a respective relative weight to be used as a probability of selecting that VNI, random selection policies, or selection based on performance metrics such as average responsiveness to service requests. In at least some embodiments, the client-side components may modify service-specified target selection policies, or use their own target selection policies.

After the membership and/or target selection information has been provided to the client-side components, the request traffic from the clients may be permitted to flow. In at least some embodiments, control-plane components of the VNI multiplexing service may collect performance and/or health state metrics pertaining to the constituent components of the IG (such as the various SCIs to which the member VNIs are attached, the instance hosts on which the SCIs run, and/or network hardware infrastructure components such as NICs being used for the IG). In some embodiments, the health state information may be collected by agents of the VNI multiplexing service itself, while in other embodiments control plane components of the VNI multiplexing service may direct or request other services to initiate collection of health state information of the IG. The health state information and/or performance metrics may be transmitted to the client-side components as well (element 813), e.g., either in response to explicit programmatic requests or in accordance with a "push" model in which explicit requests are not required. In the event of a failure associated with a VNI that is designated as a member of an IG (such as a premature shutdown of the corresponding SCI, or a hardware failure or network partitioning resulting in an instance host becoming unreachable), the control plane components may transfer the affected VNIs to other instances/hosts, or replace the affected VNIs with different VNIs (element 816). The updated membership metadata of the IG may be propagated to the client-side components after such changes are made in the depicted embodiment.

Figure 9:
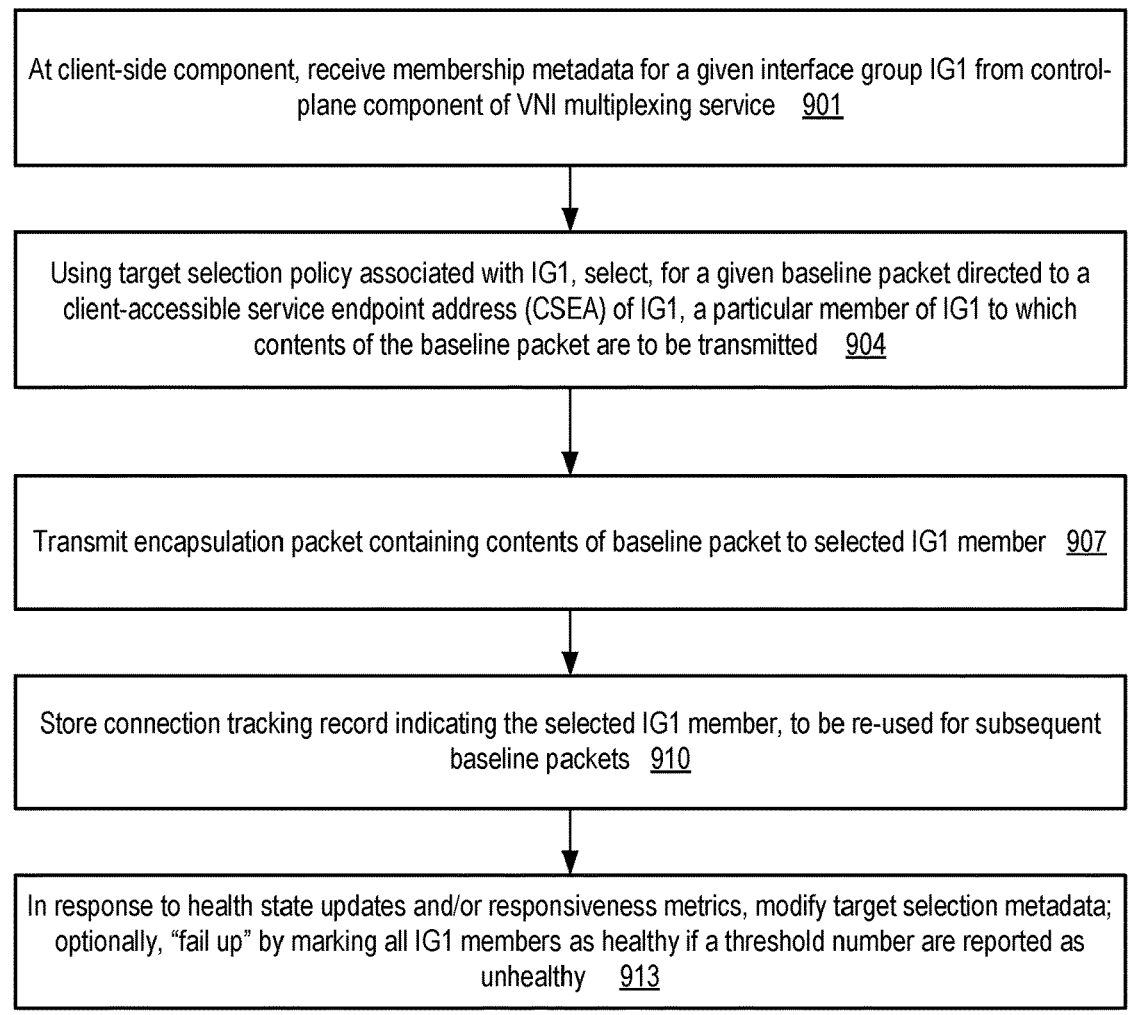
FIG. 9 is a flow diagram illustrating aspects of operations that may be performed by client-side components of a VNI multiplexing service, according to at least some embodiments.

FIG. 9 is a flow diagram illustrating aspects of operations that may be performed by client-side components of a VNI multiplexing service, according to at least some embodiments. As indicated earlier, such client-side components may be resident at virtualization management components of instance hosts and/or at edge nodes of provider networks in various embodiments. As shown in element 901 of FIG. 9, a client-side component may receive membership metadata pertaining to an interface group IG1 from a control-plane component of the VNI multiplexing service. The membership metadata may, for example, include the identifiers and/or private network addresses assigned to various member VNIs of IG1, which may have been set up to distribute service requests and responses of a service Svc1 implemented at a provider network. A CSEA of the service may have been assigned to IG1 in the depicted embodiment.

The client-side component may intercept a baseline packet (e.g., a packet representing a Svc1 service request generated at a client compute instance, or at a device at an external network) whose destination is the CSEA assigned to IG1. Using a target selection policy associated with IG1, the client-side component may identify a particular VNI of IG1 as the destination for the baseline packet (element 904). Any of a variety of target selection policies may be used in different embodiments, including policies in which the VNIs are selected as targets based on assigned weights, policies in which VNIs are selected at random, or policies in which VNIs are selected based on performance measures obtained by the client-side components for previously-transmitted packets. In at least some implementations, the private address of the selected VNI may be indicated in a destination header of an encapsulation packet whose body portion includes at least a portion of the contents of the baseline packet. Any appropriate encapsulation protocol may be used in the depicted embodiment, e.g., the GRE protocol or a custom protocol used only within the provider network.

The encapsulation packet may be transmitted on a network path towards the selected IG1 member (element 907). In at least some embodiments, a connection tracking record may be stored to indicate the particular VNI that was selected for the packet (element 910), so that, for example, that same VNI may be selected for subsequent packets of the same logical connection or sequence of packets from the same source (e.g., for subsequent baseline packets from the same process and port at a client compute instance).

In some embodiments, the client-side components may receive health state information and/or performance metrics pertaining to the members of IG1. Based on such information, the target selection metadata (e.g., the set of healthy/responsive VNIs from which one is to be selected) may be modified at the client-side component (element 913). In at least one embodiment, if the number (or fraction) of VNIs or SCIs of IG1 that are reported as being in an unhealthy state increases beyond a threshold limit, the client-side components may mark all the reportedly unhealthy members as healthy, and start distributing encapsulation packets among all the members of IG1.

It is noted that in various embodiments, operations other than those illustrated in the flow diagrams of FIGS. 8 and 9 may be used to implement at least some of the techniques for supporting VNI multiplexing. Some of the operations shown may not be implemented in some embodiments, may be implemented in a different order than illustrated in FIG. 8 or FIG. 9, or in parallel rather than sequentially.

Use Cases

The techniques described above, of aggregating virtual network interfaces into interface groups such that traffic originally directed to a particular client-accessible service endpoint address can be distributed among a number of service compute instances by client-side components, may be useful in a variety of scenarios. As more and more distributed services are migrated to provider network environments, including stateful services such as file stores that are intended to support NFS-like semantics, the need for intelligent distribution of workloads and sharing of service endpoint addresses is also increasing. The ability to dynamically adjust the number of virtual network interfaces in use for a given set of clients accessing a service, without requiring the client applications to change the endpoint addresses that they have to use, may make it much easier to implement many distributed services whose clients can have dramatically different workload requirements. The ability to associate multiple endpoint addresses of a service with a given virtual network interface, in combination with the aggregation of virtual network interfaces into interface groups, may allow a provider network operator to overcome various limitations of underlying software infrastructure (such as the maximum number of software network interface devices that can be configured within an operating system or hypervisor) that reduce the flexibility of service architectures.

Illustrative Computer System

Figure 10:
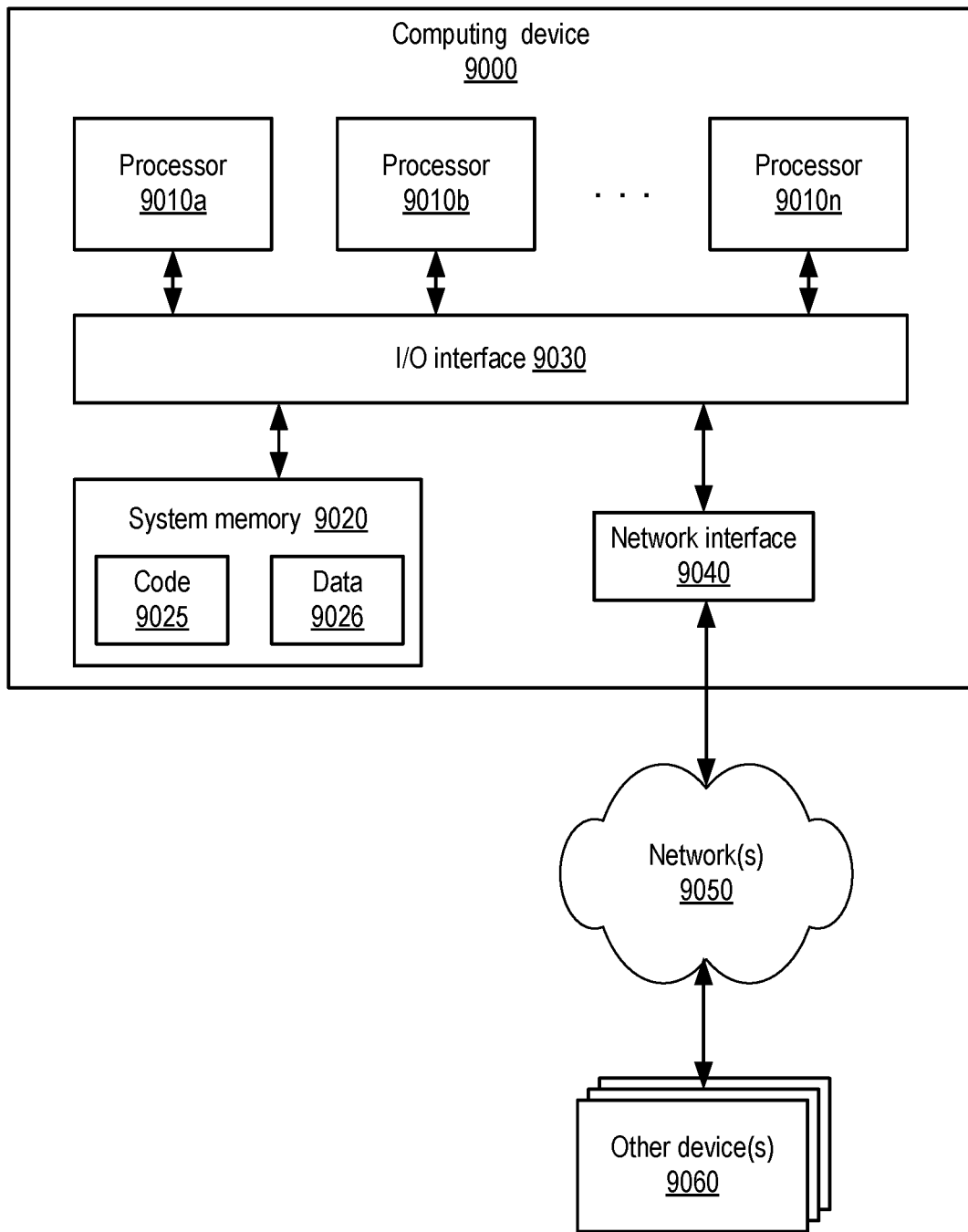
FIG. 10 is a block diagram illustrating an example computing device that may be used in at least some embodiments.

In at least some embodiments, a server that implements one or more of the control-plane and data-plane components that are used to support VNI multiplexing may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 (e.g., a NIC similar to those shown in FIG. 7a-7c) coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI)

bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
assigning, by a control plane component of a multiplexing service, a first virtual network interface (VNI) that is attached to a compute instance resident at an instance host to receive traffic directed to a plurality of client-accessible service endpoint addresses (CSEAs), including a first CSEA and a second CSEA;
selecting, by a first client-side component of the multiplexing service, the first VNI as a destination for contents of a first baseline network packet directed to the first CSEA from a first traffic source;
transmitting, by the first client-side component, a first encapsulation packet including the contents of the first baseline network packet to a particular network address assigned to the first VNI, wherein the particular network address differs from the first CSEA;
selecting, by a second client-side component of the multiplexing service, the first VNI as a destination for contents of a second baseline network packet directed to the second CSEA from a second traffic source; and
transmitting, by the second client-side component, a second encapsulation packet including the contents of the second baseline network packet to the particular network address assigned to the first VNI, wherein the particular network address differs from the second C SEA.

2. The method as recited in claim 1, further comprising:
providing, by the control plane component to the first client-side component, an indication that the first VNI and one or more other VNIs are members of a first interface group associated with the first C SEA, wherein the first client-side component selects the first VNI from the first interface group.

3. The method as recited in claim 2, further comprising:
receiving, at the control plane component, an attach request via a programmatic interface, wherein said providing the indication that the first VNI and the one or more other VNIs are members of the first interface group is responsive to the attach request.

4. The method as recited in claim 1, further comprising:
providing, by the control plane component to the first client-side component, a target selection policy, wherein said selecting the first VNI by the first client-side component is based at least in part on the target selection policy.

5. The method as recited in claim 4, wherein the target selection policy indicates a respective weight associated with one or more VNIs including the first VNI, wherein the weight associated with the first VNI is used by the first client-side component to select the first VNI.

6. The method as recited in claim 1, further comprising:
providing, by the first client-side component to a third client-side component of the multiplexing service, membership metadata of an interface group to which the first VNI belongs, wherein the interface group comprises one or more other VNIs; and utilizing, by the third client-side component, the membership metadata to select a VNI of the one or more other VNIs as a destination for contents of another baseline network packet directed to the first C SEA.

7. The method as recited in claim 1, further comprising: providing, by the control plane component to the first client-side component, health state information of a compute instance to which the first VNI is programmatically attached, wherein said selecting the first VNI by the first client-side component is based at least in part on the health state information.

8. A system, comprising:

a first set of one or more processors and memory storing program instructions that when executed cause the first set of one or more processors to implement a control plane component of a multiplexing service; and a second set of one or more processors and memory storing program instructions that when executed cause the second set of one or more processors to implement a plurality of client-side components of the multiplexing service, including a first client-side component and a second client-side component;

wherein the control plane component is configured to:
assign a first virtual network interface (VNI) to receive traffic directed to a plurality of client-accessible service endpoint addresses (CSEAs), including a first CSEA and a second CSEA;

wherein the first client-side component is configured to:
select the first VNI as a destination for contents of a first baseline network packet directed to the first CSEA from a first traffic source; and
transmit a first encapsulation packet including the contents of the first baseline network packet to a particular network address assigned to the first VNI, wherein the particular network address differs from the first CSEA; and wherein the second client-side component is configured to:
select the first VNI as a destination for contents of a second baseline network packet directed to the second CSEA from a second traffic source; and
transmit a second encapsulation packet including the contents of the second baseline network packet to the particular network address assigned to the first VNI, wherein the particular network address differs from the second CSEA.

9. The system as recited in claim 8, wherein the control plane component is further configured to:
provide, to the first client-side component, an indication that the first VNI and one or more other VNIs are members of a first interface group associated with the first CSEA, wherein the first client-side component selects the first VNI from the first interface group.

10. The system as recited in claim 9, wherein the control plane component is further configured to:
receive a request via a programmatic interface, wherein the indication that the first VNI and the one or more other VNIs are members of the first interface group is provided in response to the request.

11. The system as recited in claim 8, wherein the control plane component is further configured to:
provide, to the first client-side component, a target selection policy, wherein the first VNI is selected by the first client-side component based at least in part on the target selection policy.

12. The system as recited in claim 8, wherein the first client-side component is further configured to:
receive, from the control plane component, a target selection policy;
modify the target selection policy based at least in part on one or more performance metrics; and
utilize the modified target selection policy to select the first VNI.

13. The system as recited in claim 8, wherein the control plane component is further configured to:
provide, to the first client-side component, health state information of a compute instance to which the first VNI is programmatically attached, wherein the first VNI is selected by the first client-side component based at least in part on the health state information.

14. The system as recited in claim 8, wherein the first client-side component is further configured to:
transmit, to a network address of the first VNI, an encapsulation packet comprising contents of the first baseline network packet.

15. One or more non-transitory computer-accessible storage media storing program instructions that when executed on or across one or more processors implement a control-plane component of a multiplexing service, wherein the control-plane component is configured to:
assign a first virtual network interface (VNI) to receive traffic directed to a plurality of client-accessible service endpoint addresses (CSEAs), including a first CSEA and a second CSEA;
provide, to a first set of one or more client-side components of the multiplexing service including a first client-side component, a first set of metadata, wherein the first set of metadata is used by the first client-side component to select the first VNI as a destination for contents of a first baseline network packet directed to the first CSEA and transmit a first encapsulation packet including the contents of the first baseline network packet to a particular network address assigned to the first VNI, wherein the particular network address differs from the first CSEA; and
provide, to a second set of one or more client-side components of the multiplexing service including a second client-side component, a second set of metadata, wherein the second set of metadata is used by the second client-side component to select the first VNI as a destination for contents of a second baseline network packet directed to the second CSEA and transmit a second encapsulation packet including the contents of the second baseline network packet to the particular network address assigned to the first VNI, wherein the particular network address differs from the second CSEA.

16. The one or more non-transitory computer-accessible storage media as recited in claim 15, wherein the control plane component is further configured to:
receive, at the control plane component, a programmatic request, wherein the first set of metadata is provided to the first client-side component in response to the programmatic request.

17. The one or more non-transitory computer-accessible storage media as recited in claim 15, wherein the control plane component is further configured to:
provide, to the first client-side component, a target selection policy, wherein the first client-side component selects the first VNI based at least in part on the target selection policy.

18. The one or more non-transitory computer-accessible storage media as recited in claim 17, wherein the target selection policy indicates a respective weight associated with one or more VNIs including the first VNI, wherein the weight associated with the first VNI is used by the first client-side component to select the first VNI.

19. The one or more non-transitory computer-accessible storage media as recited in claim 15, wherein the control plane component is further configured to:
provide, to the first client-side component, health state information of a compute instance to which the first VNI is programmatically attached, wherein the first client-side component selects the first VNI based at least in part on the health state information.

20. The one or more non-transitory computer-accessible storage media as recited in claim 15, wherein the control plane component is further configured to:
receive a programmatic indication of an approval of a multi-tenant mode of operation of the first VNI, wherein, in accordance with the multi-tenant mode of operation, traffic generated on behalf of a plurality of clients of the multiplexing service is directed to the first VNI.

\* \* \* \* \*